US011003331B2

United States Patent
Huang

(10) Patent No.: US 11,003,331 B2
(45) Date of Patent: *May 11, 2021

(54) SCREEN CAPTURING METHOD AND TERMINAL, AND SCREENSHOT READING METHOD AND TERMINAL

(71) Applicant: HUAWEI TECHNOLOGIES CO., LTD., Guangdong (CN)

(72) Inventor: Xi Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/342,717

(22) PCT Filed: Jun. 13, 2017

(86) PCT No.: PCT/CN2017/088129
§ 371 (c)(1),
(2) Date: Apr. 17, 2019

(87) PCT Pub. No.: WO2018/072459
PCT Pub. Date: Apr. 26, 2018

(65) Prior Publication Data
US 2020/0042148 A1    Feb. 6, 2020

(30) Foreign Application Priority Data
Oct. 18, 2016    (CN) .......................... 201610908768.8

(51) Int. Cl.
*G06F 3/0484*    (2013.01)
*G06F 16/955*    (2019.01)
(Continued)

(52) U.S. Cl.
CPC .......... *G06F 3/0484* (2013.01); *G06F 3/0482* (2013.01); *G06F 16/9566* (2019.01); *H04L 51/10* (2013.01); *H04L 51/16* (2013.01)

(58) Field of Classification Search
CPC .. G06F 3/0484; G06F 16/9566; G06F 3/0482; H04L 51/10; H04L 51/16
See application file for complete search history.

(56) References Cited

U.S. PATENT DOCUMENTS

2003/0229854 A1*  12/2003  Lemay ................. G06F 16/345
                                                      715/227
2007/0268315 A1*  11/2007  Hoshino ............... G06F 3/0481
                                                      345/642
(Continued)

FOREIGN PATENT DOCUMENTS

CN    102663793 A    9/2012
CN    104090716 A    10/2014
(Continued)

OTHER PUBLICATIONS

International Search Report and Written Opinion issued in International Application No. PCT/CN2017/088129 dated Sep. 14, 2017, 22 pages.

(Continued)

*Primary Examiner* — Mandrita Brahmachari
(74) *Attorney, Agent, or Firm* — Fish & Richardson P.C.

(57) ABSTRACT

This application discloses a screen capturing method and terminal, the method includes: receiving, by a first terminal, a screen capturing instruction, where the screen capturing instruction is used to instruct the first terminal to obtain a screenshot of a user interface of the first terminal; determining, by the first terminal, a target element in the user interface; determining, by the first terminal, an association relationship between the target element and the screenshot of the user interface; and generating, by the first terminal, a screenshot picture of the user interface, where the screenshot picture of the user interface includes the screenshot of the user interface, the target element, and the association rela- (Continued)

tionship between the target element and the screenshot of the user interface.

15 Claims, 21 Drawing Sheets

(51) Int. Cl.
*G06F 3/0482* (2013.01)
*H04L 12/58* (2006.01)

(56) References Cited

U.S. PATENT DOCUMENTS

| | | | |
|---|---|---|---|
| 2008/0189648 A1* | 8/2008 | Anglin | G06F 16/957 715/781 |
| 2012/0213433 A1* | 8/2012 | Shimazawa | G06F 3/04815 382/164 |
| 2013/0326352 A1 | 12/2013 | Morton | |
| 2014/0074942 A1* | 3/2014 | Bhogal | G06Q 10/10 709/206 |
| 2016/0217114 A1 | 7/2016 | Fan et al. | |
| 2017/0048591 A1* | 2/2017 | Park | H04N 21/4858 |

FOREIGN PATENT DOCUMENTS

| | | |
|---|---|---|
| CN | 104461474 A | 3/2015 |
| CN | 105242827 A | 1/2016 |
| CN | 105278833 A | 1/2016 |
| CN | 105302442 A | 2/2016 |
| CN | 105426069 A | 3/2016 |
| CN | 106020608 A | 10/2016 |
| CN | 106371727 A | 2/2017 |
| WO | 2015157522 A1 | 10/2015 |

OTHER PUBLICATIONS

Office Action issued in Chinese Application No. 201780005428.7 dated Nov. 22, 2019, 18 pages (with English translation).

* cited by examiner

SCREEN CAPTURING METHOD AND TERMINAL, AND SCREENSHOT READING METHOD AND TERMINAL

CROSS-REFERENCE TO RELATED APPLICATIONS

This application is a National Stage of International Application No. PCT/CN2017/088129, filed on Jun. 13, 2017, which claims priority to Chinese Patent Application No. 201610908768.8, filed on Oct. 18, 2016. The disclosures of the aforementioned applications are hereby incorporated by reference in their entireties.

TECHNICAL FIELD

Embodiments of the present invention relate to the field of data transmission content, and in particular, to a screen capturing method and terminal, and a screenshot reading method and terminal.

BACKGROUND

Screen capturing is also referred to as screen capturing. Nowadays, obtaining content on a screen through screen capturing is a function frequently used by a user during use of a terminal. Especially for content such as a historical chat record that cannot be shared at a time, the user always shares the content with others through screen capturing and the like.

The user may usually take a screenshot of content displayed on a screen by triggering a combination of buttons on the terminal, such as a power button plus a volume down button or a power button plus a home button. After the buttons are triggered, the terminal obtains content in a video RAM, for example, a terminal running an Android system obtains content in a frame buffer (frame buffer) of a video RAM, and generates a screenshot according to the content in the video RAM. In addition, the terminal may further identify the generated screenshot. If the terminal identifies that the screenshot includes a picture, the terminal obtains an original picture by using an application program corresponding to the picture included in the screenshot, then compresses the obtained original picture and the screenshot into a compressed package, and sends the compressed package, so that during display of the screenshot, displaying of the original picture corresponding to the picture included in the screenshot may be triggered.

However, in the foregoing method, after screen capturing is completed, the original picture is obtained by identifying content in the screenshot, and the original picture and the screenshot are compressed into a compressed package for sending. This process increases complexity in a screen capturing process. In addition, because the original picture corresponding to the picture included in the screenshot and the screenshot may be in different formats, and the original picture corresponding to the picture included in the screenshot may be in diversified formats, incompatibility is caused when the screenshot that includes the original picture and that is generated by using the foregoing method is first sent to a peer end for display. In addition, only a picture element and a text element in the screenshot can be identified and obtained in the foregoing method, and a content identification degree is limited.

SUMMARY

To resolve a problem in a related technology, embodiments of the present invention provide a screen capturing method and terminal, and a screenshot reading method and terminal, to resolve a prior-art problem that complexity is increased in a method of obtaining content in a generated screenshot by identifying content in the screenshot, then compressing the content of the screenshot and the screenshot into a compressed package, and sending the compressed package. In some conditions, the method provided in the embodiments of the present invention resolves a problem that a format of an original picture corresponding to a picture included in a screenshot is incompatible with a format of the screenshot, a problem that only a picture element and a text element in the screenshot can be identified and obtained, a problem that content identification richness is limited, and a problem that the user cannot independently choose to send and receive one or more elements.

According to a first aspect, an embodiment of the present invention provides a screen capturing method, and the method includes: receiving, by a first terminal, a screen capturing instruction, where the screen capturing instruction is used to instruct the first terminal to obtain a screenshot of a user interface of the first terminal; determining, by the first terminal, a target element in the user interface; determining, by the first terminal, an association relationship between the target element and the screenshot of the user interface; and determining, by the first terminal, a screenshot picture of the user interface, where the screenshot picture of the user interface includes the screenshot of the user interface, the target element, and the association relationship between the target element and the screenshot of the user interface.

In this technical solution, the terminal determines the target element in the user interface, and then embeds the target element and the association relationship between the target element and the screenshot of the user interface into the screenshot picture of the user interface, so that a problem that a format of the screenshot is incompatible with a format of an original picture corresponding to a picture included in the screenshot, a problem that only a picture element and a text element in the screenshot can be identified and obtained, and a problem that the user cannot independently choose to send and receive one or more elements are resolved, thereby improving user experience.

In an optional implementation, the method of "determining, by the first terminal, a target element in the user interface" may include: determining, by the first terminal, the target element according to a target format, where the target format includes at least one of a picture format, a video format, an audio format, a map format, or a hyperlink format, and each target format includes at least one file format.

In another optional implementation, the method of "determining, by the first terminal, a target element in the user interface" may include: determining, by the first terminal, content of the target element, where the content includes a layout file and/or an original file, and the layout file includes source code and a source address of the target element.

In still another optional implementation, the association relationship between the target element and the screenshot of the user interface may include: an association relationship between the target element and a location of the target element in the screenshot of the user interface, and an association relationship between the target element and a proportion of the target element in the screenshot of the user interface.

In still another optional implementation, the method of "determining, by the first terminal, a screenshot picture of the user interface, where the screenshot picture of the user interface includes the screenshot of the user interface, the target element, and the association relationship between the target element and the screenshot of the user interface" may include: embedding the screenshot of the user interface, the target element, and the association relationship between the target element and the screenshot of the user interface into a metadata field of the screenshot picture of the user interface.

In still another optional implementation, the method of "receiving, by a first terminal, a screen capturing instruction, where the screen capturing instruction is used to instruct the first terminal to obtain a screenshot of a user interface of the first terminal" may include: receiving, by the first terminal, the screen capturing instruction, and determining, by the first terminal according to the screen capturing instruction, one or more application programs in a plurality of application programs running in foreground of the first terminal.

In still another optional implementation, the method of "determining, by the first terminal, one or more application programs in a plurality of application programs running in foreground of the first terminal" may include: determining, by the first terminal, the target element in the user interface according to at least one application program running in the foreground and a target format, where the target format includes at least one of a picture format, a video format, an audio format, a map format, or a hyperlink format, and each target format includes at least one format.

In still another optional implementation, the method of "obtaining, by the first terminal, the target element according to at least one application program running in the foreground" may include: determining, by the first terminal, content of the target element according to the at least one application program running in the foreground, where the content includes a layout file and/or an original file, and the layout file includes source code and a source address of the target element.

In still another optional implementation, the method of "determining, by the first terminal, a screenshot picture of the user interface, where the screenshot picture of the user interface includes the screenshot of the user interface, the target element, and the association relationship between the target element and the screenshot of the user interface" includes: displaying, by the first terminal, a selection list of the target element, to prompt a user to select one or more target elements included in the selection list of the target element; and embedding, into the screenshot picture of the user interface, a screenshot obtained after the user performs selection, a target element selected by the user, and an association relationship between the target element selected by the user and the screenshot obtained after the user performs selection.

In still another optional implementation, the selection list of the target element includes a number and/or preview information of the target element.

In still another optional implementation, after the method of "embedding, into the screenshot picture of the user interface, a screenshot of an interface obtained after the user performs selection, a target element selected by the user, and an association relationship between the target element selected by the user and the screenshot of the interface obtained after the user performs selection", the screen capturing method may include: sending, by the first terminal, the screenshot picture of the user interface.

In still another optional implementation, the method of "sending, by the first terminal, the screenshot picture of the user interface" includes: if the user interface of the first terminal includes a plurality of target elements selected by the user, separately sending the screenshot of the user interface and the plurality of target elements selected by the user; and the sending the plurality of target elements selected by the user includes: using a method for sending the original file and/or the layout file in the target element.

According to a second aspect, an embodiment of the present invention provides a screenshot reading method, and the method includes: receiving, by a second terminal, a screenshot picture of a user interface, where the screenshot picture of the user interface includes a screenshot of the user interface, a target element, and an association relationship between the target element and the screenshot of the user interface; and when it is determined, according to the association relationship between the target element and the screenshot of the user interface, that a trigger point is in an area in which one of at least one target element is located, displaying an original file corresponding to the one of the at least one target element.

In this solution, the terminal determines the screenshot picture of the user interface, to obtain one or more target elements in the screenshot picture of the user interface. This embodiment of the present invention provides the screenshot reading method, in a specific condition, more information can be obtained, operations are simple, and no compatibility problem is generated when the screenshot picture is received, so that a user can independently choose to obtain one or more elements, user quality is improved, and a problem of limited identification richness of the target element in the screenshot picture is resolved.

In an optional implementation, the method for presenting the one target element by the second terminal may include: presenting, by the second terminal, content of the one target element, where the content includes a layout file, the layout file includes source code and a source address of the target element, and the layout file is corresponding to an application program; and displaying the content of the one target element according to the layout file and the application program.

In an optional implementation, the target element includes a source address of an original file, and the method further includes: obtaining the original file according to the source address of the original file, where the source address of the original file includes a uniform resource locator.

According to a third aspect, an embodiment of the present invention provides a screen capturing terminal, and the terminal includes:

a receiver, configured to receive a screen capturing instruction, where the screen capturing instruction is used to instruct to capture a user interface of a first terminal; and a processor, configured to determine a target element in the user interface; where the processor is further configured to: determine an association relationship between the target element and a screenshot of the user interface, and determine a screenshot picture of the user interface, where the screenshot picture of the user interface includes the screenshot of the user interface, the target element, and the association relationship between the target element and the screenshot of the user interface.

In this solution, the processor determines the target element in the user interface, and then embeds the target element and the association relationship between the information and the screenshot of the user interface into the screenshot picture of the user interface. A method for obtaining information in the screenshot by identifying the screenshot picture of the user interface is provided. In a specific condition, a problem that a format of the screenshot is incompatible with a format of an original picture corresponding to a picture included in the screenshot, a problem that only a picture element and a text element in the screenshot can be identified and obtained are resolved, and a problem that a user cannot independently choose to send and receive one or more elements are resolved, so that user experience is improved.

In an optional implementation, the processor is specifically configured to determine the target element according to a target format, the target format includes at least one of a picture format, a video format, an audio format, a map format, or a hyperlink format, and each target format includes at least one format.

In another optional implementation, the processor is specifically configured to determine content of the target element, the content includes a layout file and/or an original file, and the layout file includes source code and a source address of the target element.

In still another optional implementation, the association relationship between the target element and the screenshot of the user interface includes: an association relationship between the target element and a location of the target element in the screenshot of the user interface, and an association relationship between the target element and a proportion of the target element in the screenshot of the user interface.

In still another optional implementation, the processor is specifically configured to embed the screenshot, the target element, and the association relationship between the target element and the screenshot of the user interface into a metadata field of the screenshot picture of the user interface.

In still another optional implementation, the receiver is specifically configured to receive the screen capturing instruction, and the screen capturing instruction is used to instruct the first terminal to obtain the screenshot of the user interface of the first terminal. The processor is specifically configured to determine, according to the screen capturing instruction, one or more application programs in a plurality of application programs running in foreground of the first terminal.

In still another optional implementation, the processor is specifically configured to determine the target element in the user interface according to at least one application program running in the foreground and a target format, the target format includes at least one of a picture format, a video format, an audio format, a map format, or a hyperlink format, and each target format includes at least one format.

In still another optional implementation, the processor is specifically configured to determine content of the target element according to the at least one application program running in the foreground, the content includes a layout file and/or an original file, and the layout file includes source code and a source address of the target element.

In still another optional implementation, the terminal includes: a display, configured to display a selection list of the target element, to prompt a user to select one or more target elements in the selection list of the target element, and the processor is specifically configured to embed, into the screenshot picture of the user interface, a screenshot of an interface obtained after the user performs selection, a target element selected by the user, and an association relationship between the target element selected by the user and the screenshot of the interface obtained after the user performs selection.

In still another optional implementation, the selection list of the target element may include a number and/or preview information of the target element.

In still another optional implementation, the terminal includes: a transmitter, configured to send the screenshot picture of the user interface, where the screenshot picture of the user interface includes the screenshot of the user interface, the target element, and the association relationship between the target element and the screenshot of the user interface.

In still another optional implementation, the processor is specifically configured to: if the user interface of the first terminal includes a plurality of target elements selected by the user, separately send the screenshot of the user interface and the plurality of target elements selected by the user; and the sending the plurality of target elements selected by the user includes: using a method for sending the original file and/or the layout file in the target element.

According to a fourth aspect, an embodiment of the present invention provides a screenshot reading terminal, and the terminal includes:

a receiver, configured to receive a screenshot picture of a user interface, where the screenshot picture of the user interface includes a screenshot of the user interface, a target element, and an association relationship between the target element and the screenshot of the user interface; and a processor, configured to: when determining, according to the association relationship between the target element and the screenshot of the user interface, that a trigger point is in an area in which one of at least one target element is located, display an original file corresponding to the one of the at least one target element.

In this solution, the processor determines the screenshot picture of the user interface, to obtain one or more target elements in the screenshot picture of the user interface. This embodiment of the present invention provides the screenshot reading terminal, in a specific condition, more information can be obtained, operations are simple, and no compatibility problem is generated when the screenshot picture is received, so that a user can independently choose to obtain one or more elements, user quality is improved, and a problem of limited identification richness of the target element in the screenshot picture is resolved.

In an optional implementation, the terminal further includes a display, configured to present the one target element, including: presenting, by the display, content of the one target element, where the content includes a layout file, the layout file includes source code and a source address of the target element, and the layout file is corresponding to an application program; and displaying the content of the one target element according to the layout file and the application program. In an optional implementation, the target element may include a source address of an original file, the original file is obtained according to the source address of the original file, and the source address of the original file includes a uniform resource locator.

According to a fifth aspect, an embodiment of this application provides a computer readable storage medium, and the computer readable storage medium stores an instruction. When the instruction is run on a computer, the computer performs the method in the foregoing aspects.

According to a sixth aspect, an embodiment of this application provides a computer program product that includes an instruction. When the instruction is run on a computer, the computer performs the method in the foregoing aspects.

DESCRIPTION OF EMBODIMENTS

To facilitate understanding of embodiments of the present invention, the following further describes the embodiments of the present invention in detail by using specific embodiments with reference to the accompanying drawings. The embodiments do not limit the embodiments of the present invention.

In technical solutions provided in the embodiments of the present invention, a terminal determines a target element in a user interface, and then embeds the target element and an association relationship between the target element and a screenshot of the user interface into a screenshot picture of the user interface, so that a problem that a format of the screenshot is incompatible with a format of an original picture corresponding to a picture included in the screenshot, a problem that only a picture element and a text element in the screenshot can be identified and obtained, and a problem that the user cannot independently choose to send and receive one or more elements are resolved, thereby improving user experience.

The terminal in the embodiments of this application includes: a screen capturing terminal and a screenshot picture reading terminal that are involved in the embodiments of the present invention. The two terminals may be one terminal, that is, the terminal can not only capture a screenshot picture but also read the screenshot picture. The terminal may include a mobile phone, a tablet computer, a notebook computer, a personal digital assistant (personal digital assistant, PDA), a point of sale (point of sale, POS), a vehicle-mounted computer, or the like. The terminal may include at least a memory, a touchscreen, and a processor, and the storage may be configured to store a software program. The processor performs various functions of the terminal by running the software program stored in the storage, and the touchscreen may be configured to display information input by a user, information provided for the user, and various menus of the terminal, and may further receive user input. For ease of description, in this application, the terminal is specifically described below by using a mobile phone as an example.

Figure 1:
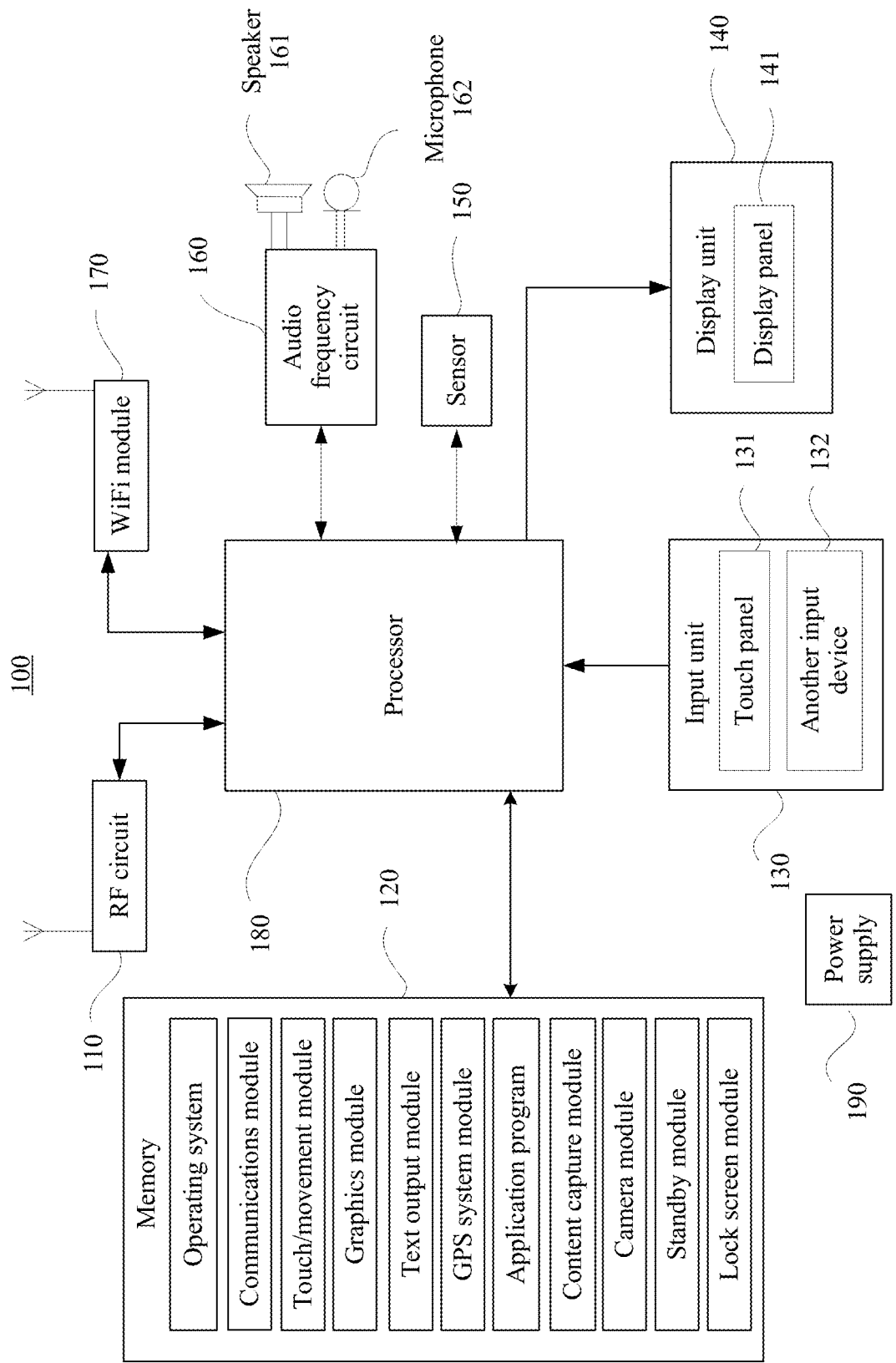
FIG. 1 is a schematic structural diagram of a screen capturing terminal according to an embodiment of the present invention.

FIG. 1 is a schematic structural diagram of a terminal according to an embodiment of the present invention. FIG. 1 is a schematic structural diagram of a mobile phone related to this embodiment of this application. As shown in FIG. 1, FIG. 1 is a block diagram of a partial structure of a mobile phone 100. The mobile terminal 100 includes an RF (Radio Frequency, radio frequency) circuit 110, a memory 120, an input unit 130, a display unit 140, a sensor 150, an audio frequency circuit 160, a WiFi (Wireless Fidelity, Wireless Fidelity) module 170, a processor 180, and a power supply 190. Persons skilled in the art may understand that the structure of the mobile phone shown in FIG. 1 imposes no limitation on the mobile phone, and the mobile phone may include more or fewer components than those shown in the figure, or combine some components, or have different component arrangements.

The following specifically describes each component of the mobile phone 100 with reference to FIG. 1.

The RF circuit 110 may be configured to: receive and send information or receive and send a signal during a call. The RF circuit 110 receives downlink information from a base station, and sends the downlink information of the base station to the processor 180, and the server processes the downlink information. In addition, the RF circuit 110 may further send related uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 110 may further communicate with a network and/or another device through radio communications. The radio communications may use any communications standard or protocol, including but not limited to GSM (Global System for Mobile Communications, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Message Service, short message service), or the like.

The memory 120 may be configured to store a software program and a module. Generally, the memory 120 includes but is not limited to an operating system, a communications module, a touch/movement module, a graphics module, a text output module, a GPS system module, an application program, a content capture module, a camera module, a standby module, and a lock screen module. In addition, the memory 120 may mainly include a program storage area and a data storage area. The program storage area may store an operating system, an application program required by at least one function (such as an audio play function or an image play function), and the like. The data storage area may store data (such as audio data or a phonebook) created according to use of the mobile phone 100, and the like. The memory 120 may further include a high-speed random access memory, or may include a nonvolatile memory, such as at least one magnetic disk storage component, a flash storage component, or another volatile solid-state storage component. In addition, the touch/movement module included in the memory 120 is configured to: detect touch between an object or a finger and a touchscreen 140 or a tapping touch wheel, capture a touch speed (a direction and a size), an acceleration (a change in a size or a direction), and determine a touch event type. For example, there is a detection module for a plurality of touch events: figure-down/dragging/up/tap, and sometimes, a gesture and an element in a UI interface are combined to implement some operations: pinching/depinching (finger pinching/stretching), and the like.

The graphics module is configured to render and display a graph on a touchscreen or another display, and graphs include a web page, an icon, a digital image, a video, and an animation.

The application program may include contacts, a telephone, a video conference, an email client, instant messaging, personal motion, a camera, image management, a video player, a music player, a calendar, a plug-in (weather, stock, a calculator, a clock, and a dictionary), a customized plug-in, searching, a note, a map, an online video, and the like.

The input unit 130 may be configured to: receive input digit or character information, and generate key signal input related to user settings and function control of the mobile phone 100. The input unit 130 may include a touch panel 131 and another input device 132. The touch panel 131 is also referred to as a touchscreen, and can collect a touch operation (for example, an operation performed by a user on the touch panel 131 or near the touch panel 131 by using any suitable object or accessory such as a finger or a stylus) performed by the user on or near the touch panel 131, and drive a corresponding connection apparatus according to a preset program. In addition, the touch panel 131 may further include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into touch point coordinates, then sends the touch point coordinates to the processor 180, and can receive and execute a command sent by the processor 180. Specifically, the touch panel 131 may be implemented by using a plurality of types, such as a resistive type, a capacitive type, an infrared ray, and a surface acoustic wave. In addition to the touch panel 131, the input unit 130 may include another input device 132. The another input device 132 may include but be not limited to one or more of a physical keyboard, a function key (such as a volume control key or an on/off key), a trackball, a mouse, a joystick, or the like.

The display unit 140 may be configured to display information input by the user or information provided for the user, and various menus of the mobile phone 100. The display unit 140 may include a display panel 141, and the display panel 141 may be configured by using an LCD (Liquid Crystal Display, liquid crystal display), an OLED (Organic Light-Emitting Diode, organic light-emitting diode), or the like. Further, the touch panel 131 may cover the display panel 141. When detecting the touch operation on or near the touch panel 131, the touch panel 131 transmits the touch operation to the processor 180 to determine a touch event type, and then the processor 180 provides corresponding visual output on the display panel 141 according to the touch event type. Although the touch panel 131 and the display panel 141 in FIG. 1 are used as two independent components to implement input and input functions of the mobile phone 100, in some embodiments, the touch panel 131 and the display panel 141 may be integrated to implement the input and output functions of the mobile phone 100. In addition, for the present invention, the display unit may further provide display of a screenshot picture, and the like.

The mobile phone 100 may further include at least one sensor 150, such as a light sensor, a motion sensor, and another sensor. Specifically, the light sensor may include an ambient light sensor and a proximity sensor. The ambient light sensor may adjust luminance of the display panel 141 according to brightness of an ambient light. The proximity sensor may close the display panel 141 and/or backlight when the mobile phone 100 approaches an ear. As a type of motion sensor, an accelerometer sensor may detect magnitudes of accelerations in all directions (generally three axes), may detect a value and a direction of gravity at rest, and may be applied to an application used for identifying a mobile phone posture (for example, screen switching between landscape and portrait, a related game, and magnetometer posture calibration), and a vibration recognition related function (such as a pedometer and a stroke), and the like. A gyroscope, a barometer, a hygrometer, a thermometer, an infrared sensor, and another sensor may be further configured on the mobile phone 100, and details are not described herein.

The audio frequency circuit 160, a speaker 161, and a microphone 162 may provide an audio interface between the user and the mobile phone 100. The audio frequency circuit 160 may transmit, to the speaker 161, an electrical signal converted from received audio data, and the speaker 161 converts the electrical signal into a sound signal for output. In addition, the microphone 162 converts a collected sound signal into an electrical signal, and the audio frequency circuit 160 receives the electrical signal, converts the electrical signal into audio data, and outputs the audio data to the RF circuit 110 to send the audio data to, for example, another mobile phone, or outputs the audio data to the memory 120 for further processing.

WiFi is a short-distance wireless transmission technology. By using the WiFi module 170, the mobile phone 100 may help the user receive or send an e-mail, browse a web page, access streaming media, and the like. The WiFi module 170 provides wireless broadband Internet access for the user. Although FIG. 1 shows the WiFi module 170, it may be understood that the WiFi module 170 is not a mandatory component of the mobile phone 100, and can be omitted as required without changing an essence of the present invention.

By running the software program and the module stored in the memory 120, the processor 180 executes various function applications and data processing of the mobile phone 100. The processor 180 is a control center of the mobile phone 100, uses various interfaces and lines to connect all parts of the entire mobile phone, and performs various functions and data processing of the mobile phone 100 by running or executing the software program and/or the module stored in the memory 120 and invoking data stored in the memory 120, to perform overall monitoring on the mobile phone. Optionally, the processor 180 may include one or more processing units. An application processor and a modem processor may be integrated into the processor 180, the application processor mainly processes an operating system, a user interface, an application program, and the like, and the modem processor mainly processes radio communications. It may be understood that the modem processor may not be integrated into the processor 180.

The mobile phone 100 further includes the power supply 190 (such as a battery) that supplies power to the components. The power supply may be logically connected to the processor 180 by using a power supply management system, so that functions such as charging management, discharging management, and power consumption management are implemented by using the power supply management system.

Although not shown, the mobile phone 100 may further include a camera, a Bluetooth module, and the like. Details are not described herein.

Embodiments of the present invention are further described below with reference to FIG. 2 to FIG. 9.

Figure 2:
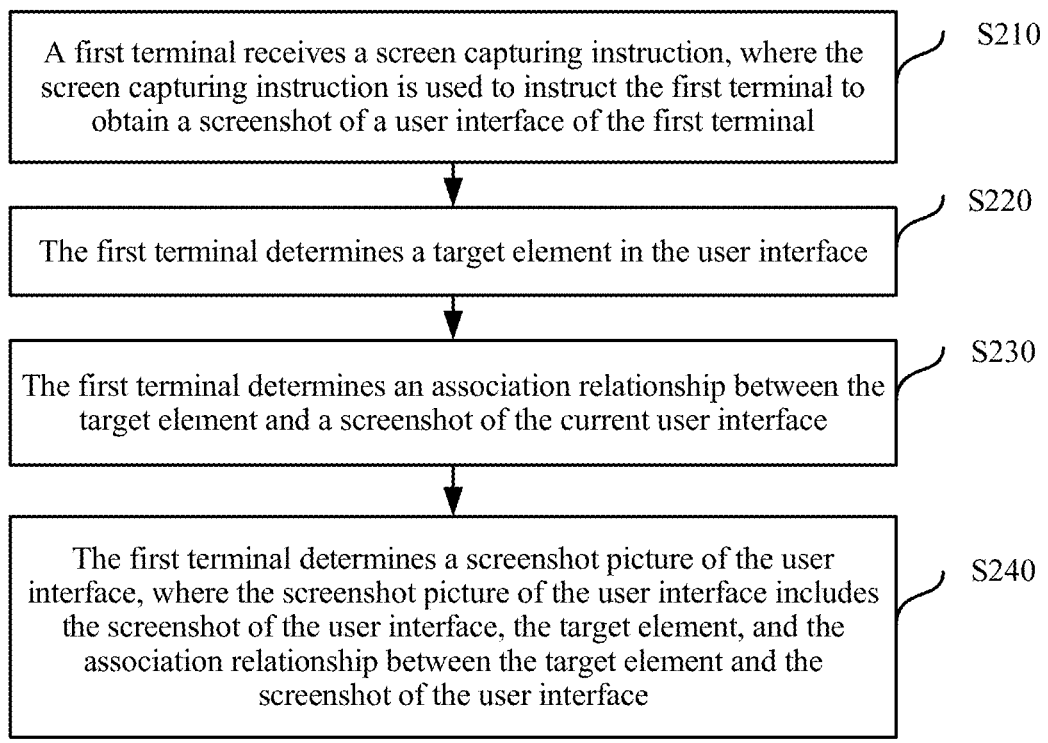
FIG. 2 is a flowchart of a screen capturing method according to an embodiment of the present invention.

FIG. 2 is a flowchart of a screen capturing method according to an embodiment of the present invention. As shown in FIG. 2, the method specifically includes the following steps.

S210. A first terminal receives a screen capturing instruction, where the screen capturing instruction is used to instruct the first terminal to obtain a screenshot of a user interface of the first terminal.

This step is mainly performed by an instruction receiving module that needs to cooperate with a hardware module, for example, an input unit or a sensor unit. The input unit is configured to obtain user input, such as pressing/activating a button or a sensor, and the sensor unit is configured to obtain a fingerprint of a user or a device motion status.

Figure 3:
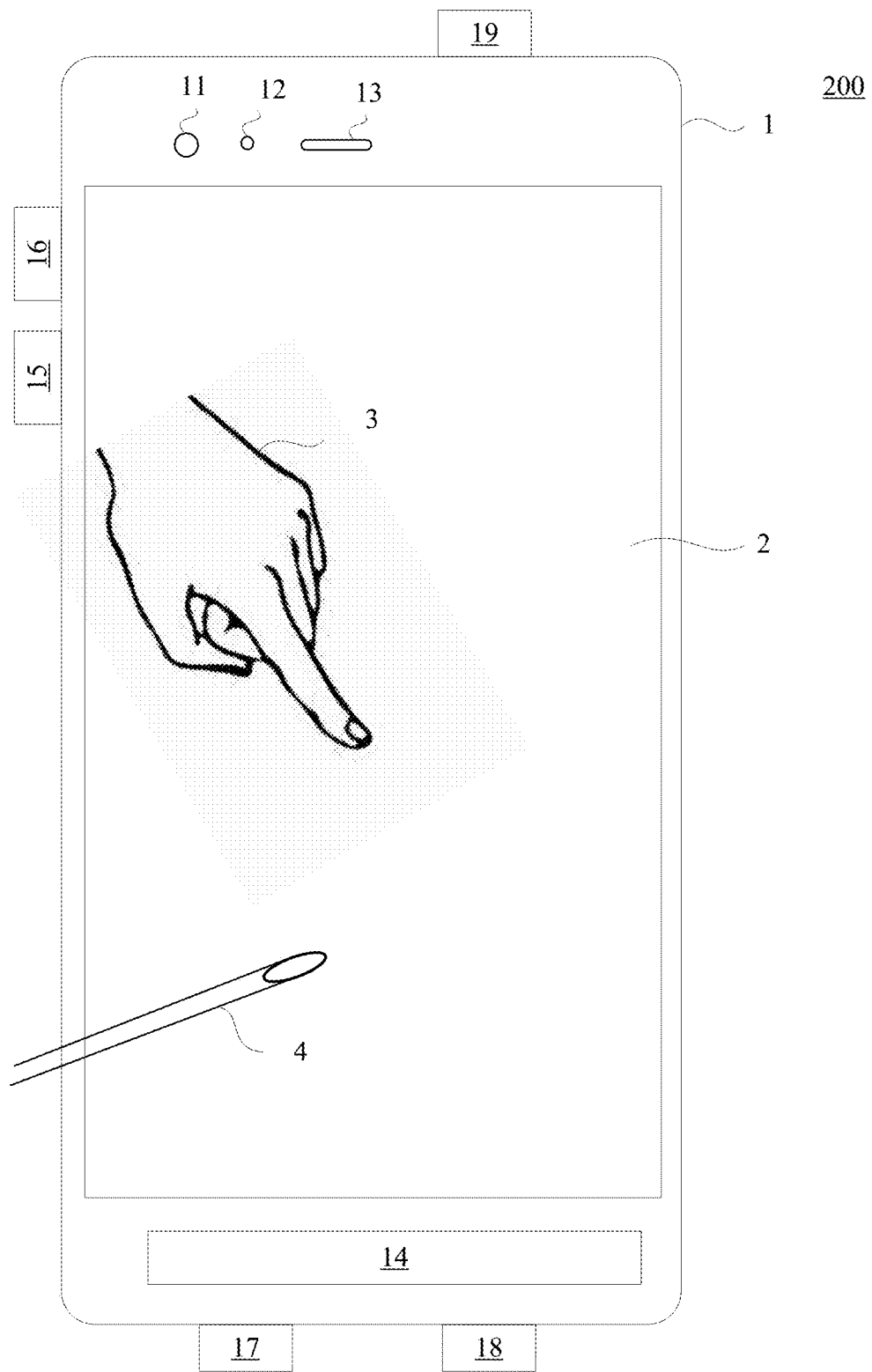
FIG. 3 is a schematic structural diagram of another screen capturing mobile phone according to an embodiment of the present invention.

Specifically, as shown in FIG. 3, the mobile phone 200 includes a body 1 and a touchscreen 2 (for example, the touchscreen 131 shown in FIG. 1). Input and output functions of the mobile phone 200 may be implemented by integrating the touchscreen 2 and a display panel (for example, 141 shown in FIG. 1). The body 1 includes a camera 11, a photosensitive element 12, an earpiece 13, an entity button 14, a power button 15, a volume button 16, and the like. The camera 11 may include a front-facing camera and a rear-facing camera. The photosensitive element 12 is mainly configured to detect a distance between a human body and the mobile phone. For example, when a user makes a call, the mobile phone is next to an ear, and after the photosensitive element 12 detects distance information, the touchscreen of the mobile phone 200 may disable the input function, to prevent accidental touch. The entity button 14 is usually a home button, or may be a home button that integrates a fingerprint recognition module, and the entity button 14 may further include a return button, a menu button, and an exit button. In addition, the entity button 14 may further be a touch button on a specified location on the touchscreen. For details of the entity button 14, the power button 15, and the volume button 16, refer to descriptions of another input device 130 in the embodiment shown in FIG. 1. It should be known that this embodiment of this application may further include a microphone 17, a data interface 18, a subscriber identity module (Subscriber Identification Module, SIM) card interface (not shown in the figure), a headset interface 19, and the like.

It should be known that the mobile phone 200 shown in FIG. 2 is merely an example, and does not constitute a limitation, and may include more or fewer components than those in the figure, or may combine some components, or split some components, or have different component arrangements.

The screenshot operation may be triggered in at least the following manners:

Manner 1: Receive, by using an entity button on a terminal, an input signal for inputting a screenshot, for example, a combination of buttons included in another input device 132 in an input unit 130: a power button 15 plus a volume button 16, or a dedicated button such as an entity button 14 shown in FIG. 3, or a fingerprint sensor included in the sensor 150. Receiving the screen capturing instruction is to receive an operation of pressing/activating the foregoing button or sensor by the user.

Manner 2: Receive, by using a virtual key on a terminal, an input signal for inputting a screenshot, for example, a screenshot key on a notification bar displayed on a display panel 141 in a display unit 140, and a screenshot key that is resident on an interface. Receiving the screen capturing instruction is to receive, by using a touch panel 131 in an input unit 130, a touch operation performed by the user on a location corresponding to the screenshot key.

Manner 3: Receive a voice operation instruction of the user by using the microphone 17 (for example, a microphone 162 in the audio frequency circuit 160 shown in FIG. 1), and receive an eyeball motion instruction and/or a gesture control instruction by using the camera 11 or the photosensitive element 12 (for example, an image sensor 150 shown in FIG. 1); that is, receive a voice instruction of the user by using the microphone 17, or track user's eyeball motion by using the camera 11, or obtain a user's hand action by using a motion sensor (such as an acceleration or a three-axis gyroscope), or obtain pressure of the user by using a pressure sensor.

Manner 4: As shown in FIG. 3, the user may perform a screen capture operation such as tap or slide on the touchscreen by using a finger 3 or a stylus 4. The touch panel may detect these screen capture operations, and the touchscreen may also be referred to as a screen.

S220. The first terminal determines a target element in the user interface.

Figure 4:
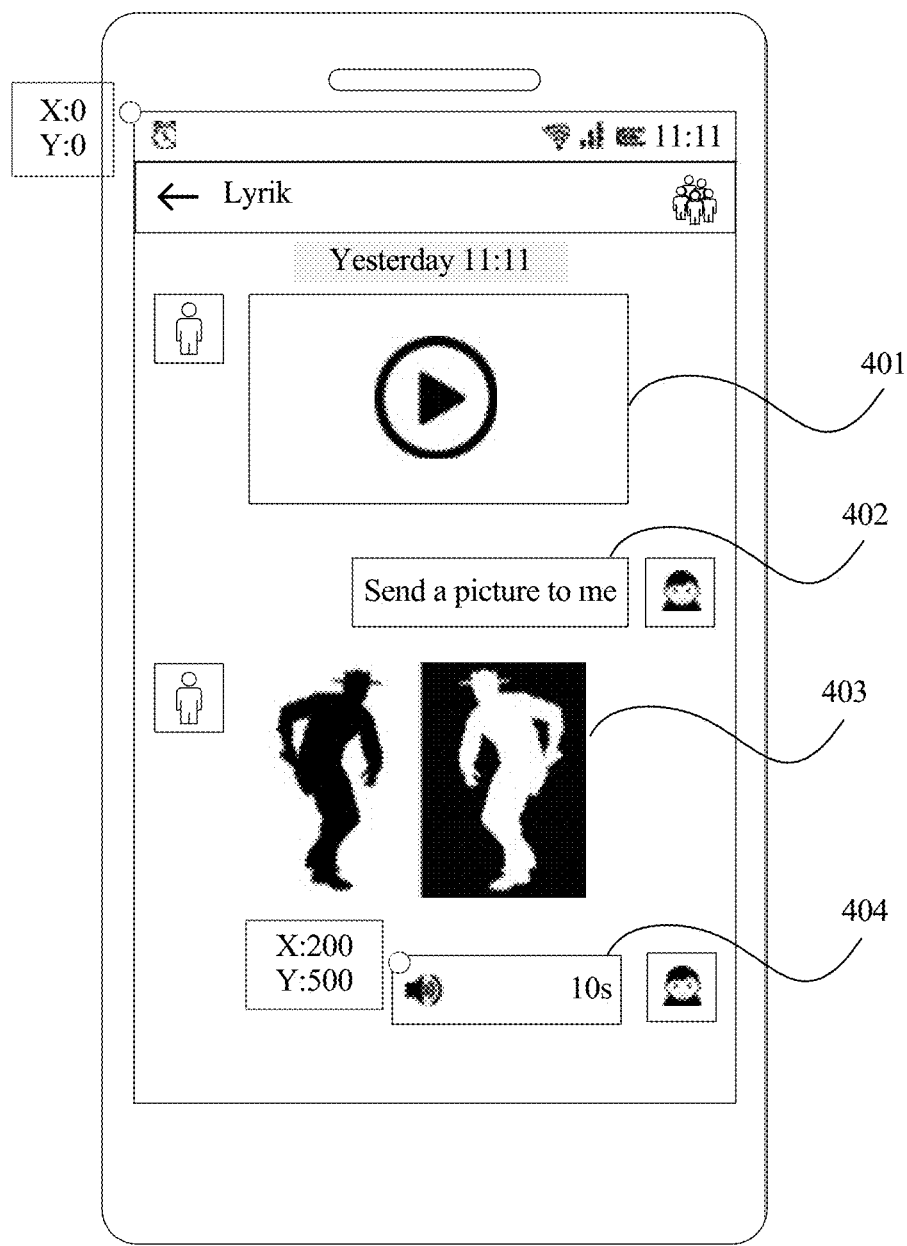
FIG. 4 is a schematic diagram of an interface of a mobile phone according to an embodiment of the present invention.
Figure 5:
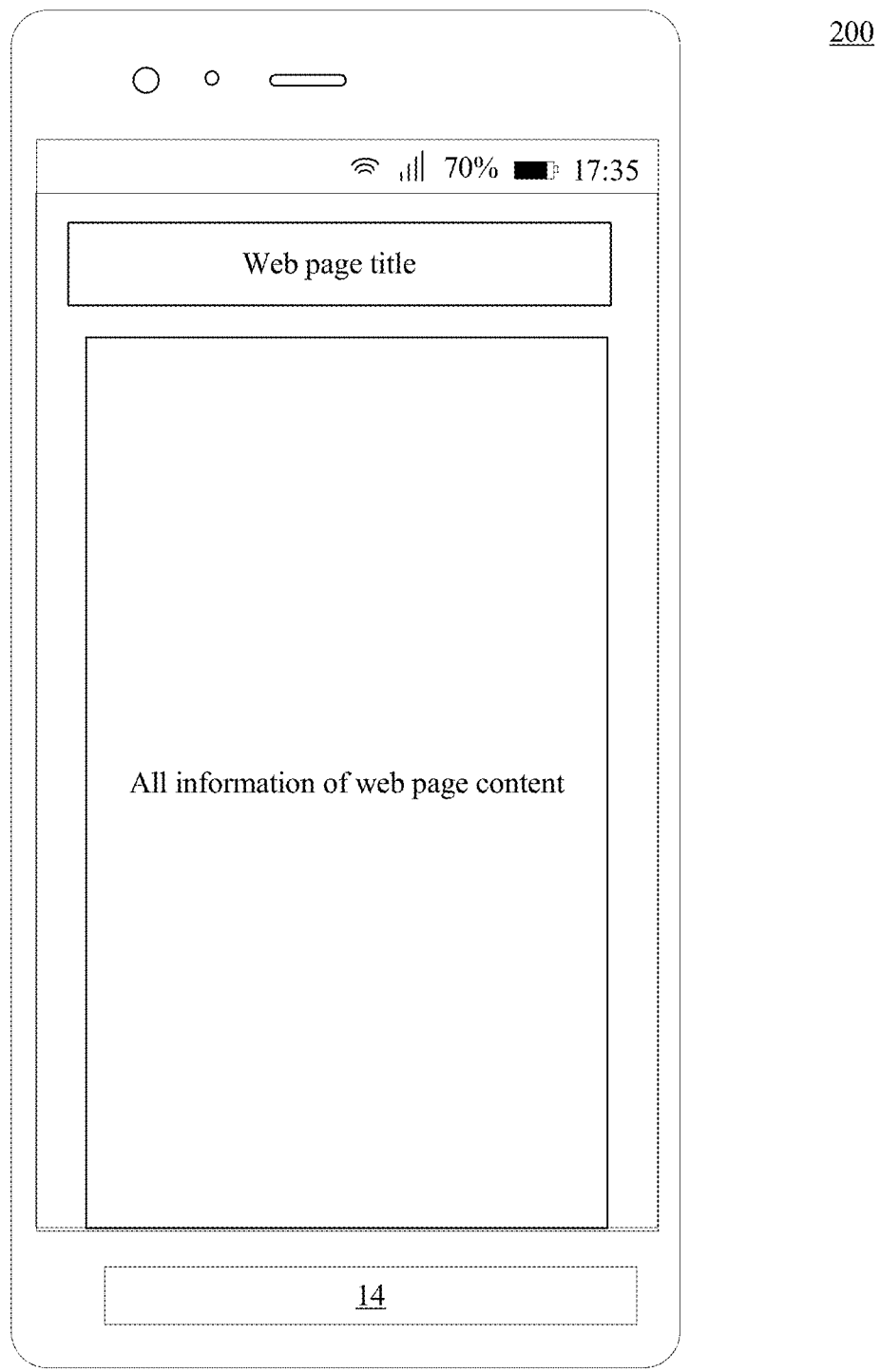
FIG. 5 is a schematic diagram of another interface according to an embodiment of this application.

First, the first terminal determines a target element in a plurality of elements in the user interface. The plurality of elements may include a text, a picture, audio, a geographical location, a link, a contact card, and the like. The processor 180 in FIG. 1 may execute program code stored in the memory 120, to determine the target element included in the user interface. For example, as shown in FIG. 4, 401 is a video element, 402 is a text element, 403 is a picture element, and 404 is a voice element. Specifically, the target element in the plurality of elements included in the user interface may be determined in at least the following manners:

Manner 1: The terminal performs determining in an image recognition manner (may perform image recognition on a current user interface by using, for example, a graphics module in the memory 120 in FIG. 1, to determine the target element). Specifically, visual elements such as the text element and the picture element in the user interface may be distinguished by using an image recognition technology. For the text element, specific text content may be further identified by using an OCR (Optical Character Recognition, optical character recognition) technology. For the picture element 401, content included in the picture may be further identified, and a label may be selectively marked. The label may include a person, a scene, an object, and the like. For example, if the picture element 403 in FIG. 4 currently displays a task, the picture element 403 may be labeled as a task, and a label location may be selectively on the picture. For example, when the terminal identifies that the picture element includes trees and mountains, the label may be a scene.

Manner 2: Obtain, by analyzing a UI layout file of an application program, an element included in the user interface. It may be understood that the UI layout file of the application program may be a layout file of a user interface of the application program, and the UI layout file may include source code of a web page and/or a source address of the target element. Specifically, the terminal determines, according to a target format in the UI layout file, the target element included in the plurality of elements in the user interface. The first terminal determines the target element according to the target format, the target format includes at least one of a picture format, a video format, an audio format, a map format, or a hyperlink format, and each target format includes at least one format. The first terminal may not only obtain a layout file of the target element, but also directly obtain an original file of the target element. For example, as shown in FIG. 4, if the video element 401 is locally downloaded, the first terminal may directly obtain an original file of the video element 401. If the video element 401 is not locally downloaded, the first terminal may obtain website information of the video element 401 by obtaining source code of the video element 401 in the web page.

Figure 6:
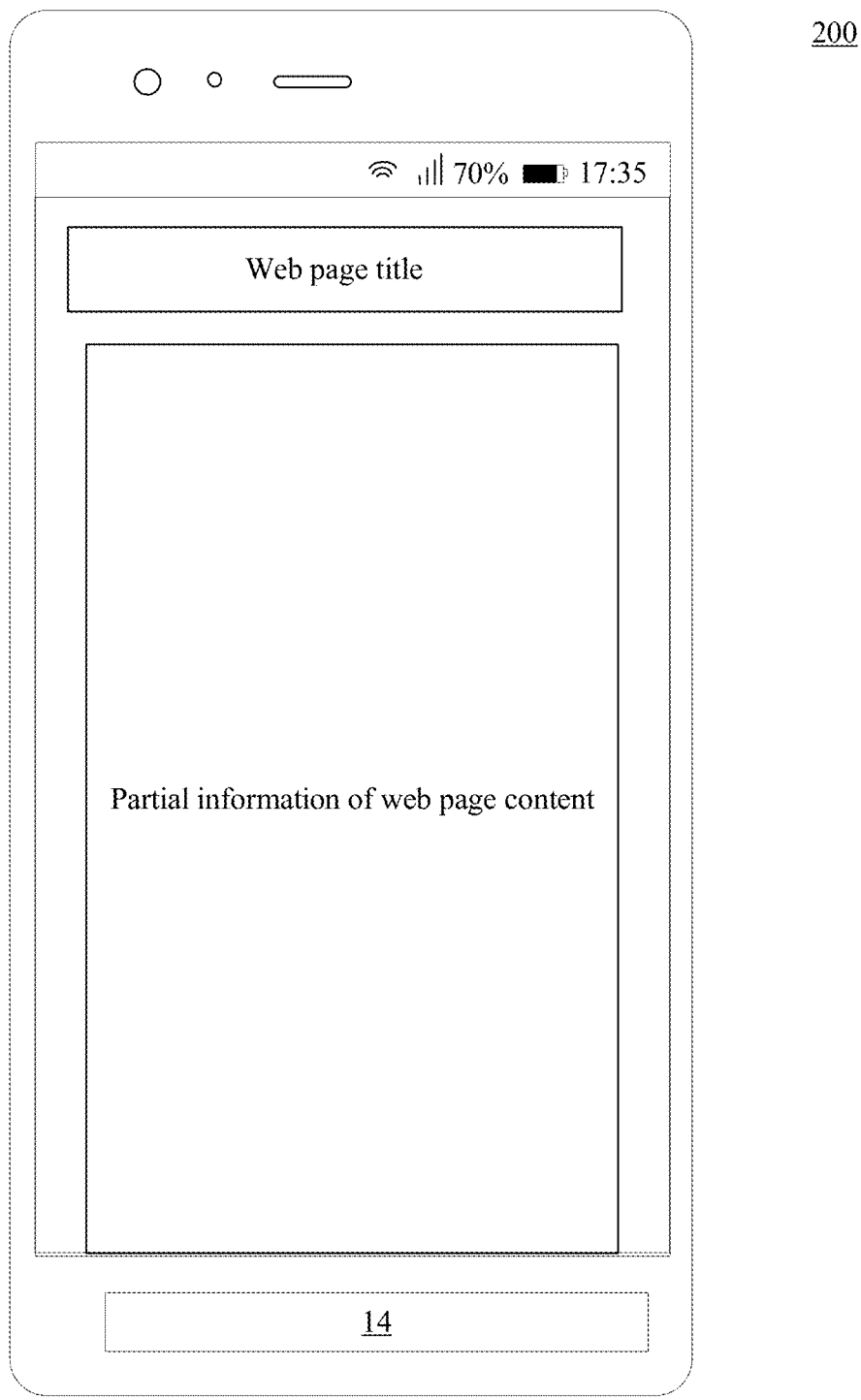
FIG. 6 is a schematic diagram of still another interface according to an embodiment of this application.
Figure 7:
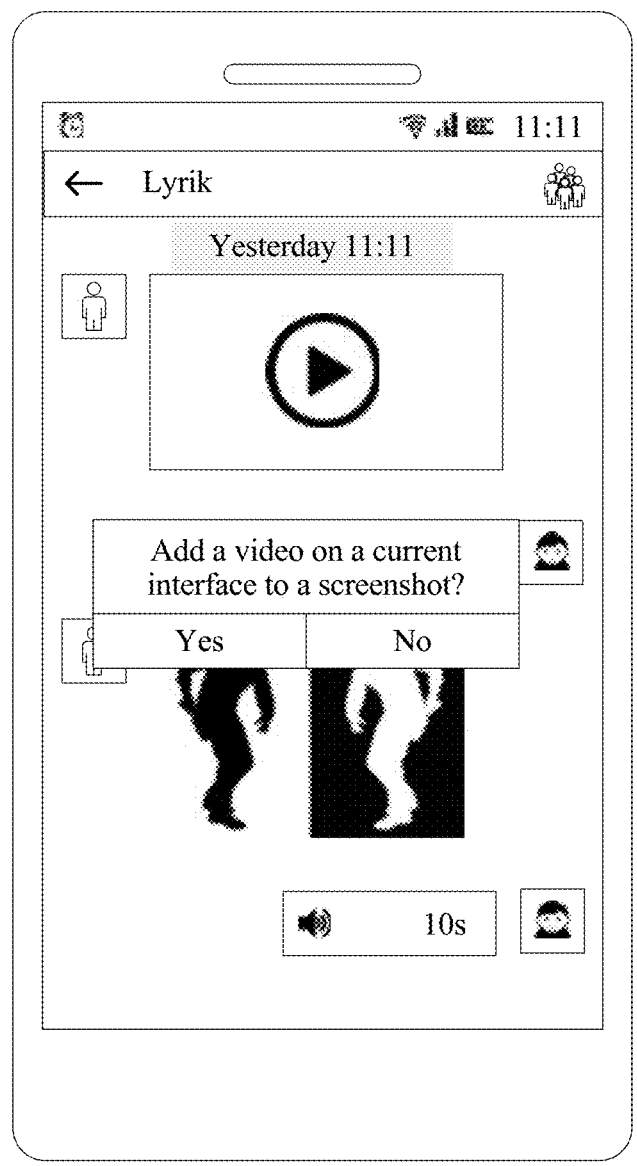
FIG. 7 is a schematic diagram of yet another interface according to an embodiment of this application.

It should be noted that the foregoing method for determining the target element may be used to determine the target element through common screen capturing or long screen capturing. The common screen capturing is to capture content, displayed on a current display page, of the user interface. As shown in FIG. 6, the long screen capturing is to capture content displayed on a current display page and content that is not displayed on the current display page and displayed after the current display page, as shown in FIG. 7. Specifically, whether the current interface includes the target element may be determined according to the method 1 and the method 2, and the target element includes but is not limited to one or more of content types such as a picture, audio, a video, a link, or geographic location information.

In addition, it should be understood that, in step S220, at the same time of determining the target element in the user interface, the first terminal obtains the original file and/or the layout file of the target element. The layout file may include source code and a source address of the target element.

That the first terminal determines the target element in the user interface includes: determining a storage location of the target element and content of the target element. The content of the target element includes the original file and/or the layout file of the target element, and the layout file may include the source code and the source address of the target element.

Specifically, when the target element in the user interface is determined according to the method in S220, the terminal needs to determine the content of the target element and the storage location of the target element. For example, when the target element is a picture, if the terminal identifies that the user interface includes two pictures, the terminal obtains storage locations corresponding to the two pictures from the terminal or a web page, and reads or downloads the two corresponding pictures from the storage locations. The storage location may be a non-volatile memory, such as an SD card or built-in storage of the mobile phone, or may be a volatile memory, such as memory or a video RAM, or may be a URL (Uniform Resource Locator, uniform resource locator) on the Internet.

When the target element is a video, if the terminal identifies that the user interface includes a video, the terminal obtains a storage location corresponding to the video, where the storage location may be any one of the foregoing picture storage locations, and reads and/or downloads the corresponding video from the storage location.

Similarly, when it is identified that the user interface includes another element such as a voice, the another element may be read/downloaded in an obtaining manner as that of the picture and/or the video, and details are not described herein again.

S230. The first terminal determines an association relationship between the target element and the screenshot of the user interface.

The association relationship between the target element and the screenshot of the user interface includes: an association relationship between the content of the target element and a location of the target element in the screenshot of the user interface, and an association relationship between the content of the target element and a proportion of the target element in the screenshot of the user interface.

When the content of the target element is determined, a size, a location, and the like of the target element in the screenshot of the user interface may also be obtained, for example, when the obtained target element is a voice message, a location and a size of an icon of the obtained voice message in the picture may be obtained.

As shown in FIG. 4, an upper-left corner of a screen is an origin (x=0, y=0) of coordinates, coordinates of the voice element 404 at the bottom are (x=200, y=500), a size of the voice element 404 is (length=200, height=40), and a shape of the voice element 404 is (shape=rectangle). It may be understood that when a displayed element is a circle, only a center, a radius, and a shape attribute that are of the circle need to be recorded; and when a displayed element is an irregular graph, the irregular graph may be approximately processed as a shape such as a rectangle, a circle, or a polygon, and coordinates, a size, and a shape attribute are correspondingly recorded.

S240. The first terminal determines a screenshot picture of the user interface, where the screenshot picture of the user interface includes the screenshot of the user interface, the target element, and the association relationship between the target element and the screenshot of the user interface.

The association relationship between the target element and the screenshot of the user interface is embedded into a metadata field of the screenshot picture of the user interface.

Specifically, an embedding manner may be: directly adding the target element to a thumbnail field (picture) and/or an audio field (audio) of an EXIF (Exchangeable Image File, Exchangeable Image File) of a screen content picture. For example, information such as a link or geographic location coordinates may be directly added to a user comments field in the EXIF of the screen content picture. In addition, attributes representing a display location, a size, and a shape of the target element in the screenshot of the user interface may also be added to the metadata of the screenshot picture of the user interface, to mark a location of the target element in the screenshot picture of the user interface during display of the screenshot picture of the user interface.

In an implementable implementation, the user may select, from all target elements included in the user interface, a target element that needs to be added to the screenshot picture. A manner may be shown in FIG. 7. A manner of receiving user's selection may be: obtaining the touch operation of the user by using the touch panel 131 in the input unit 130, for example, if the user touches "Yes" in FIG.

Figure 8:
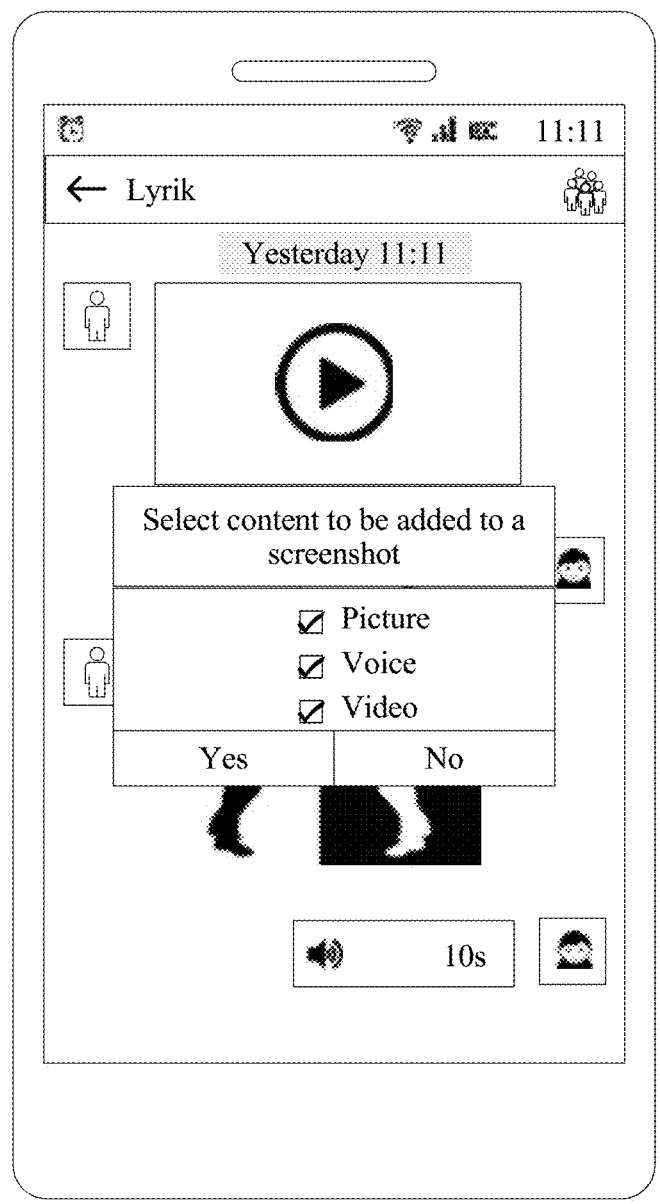
FIG. 8 is a schematic diagram of yet another interface according to an embodiment of this application.
Figure 9:
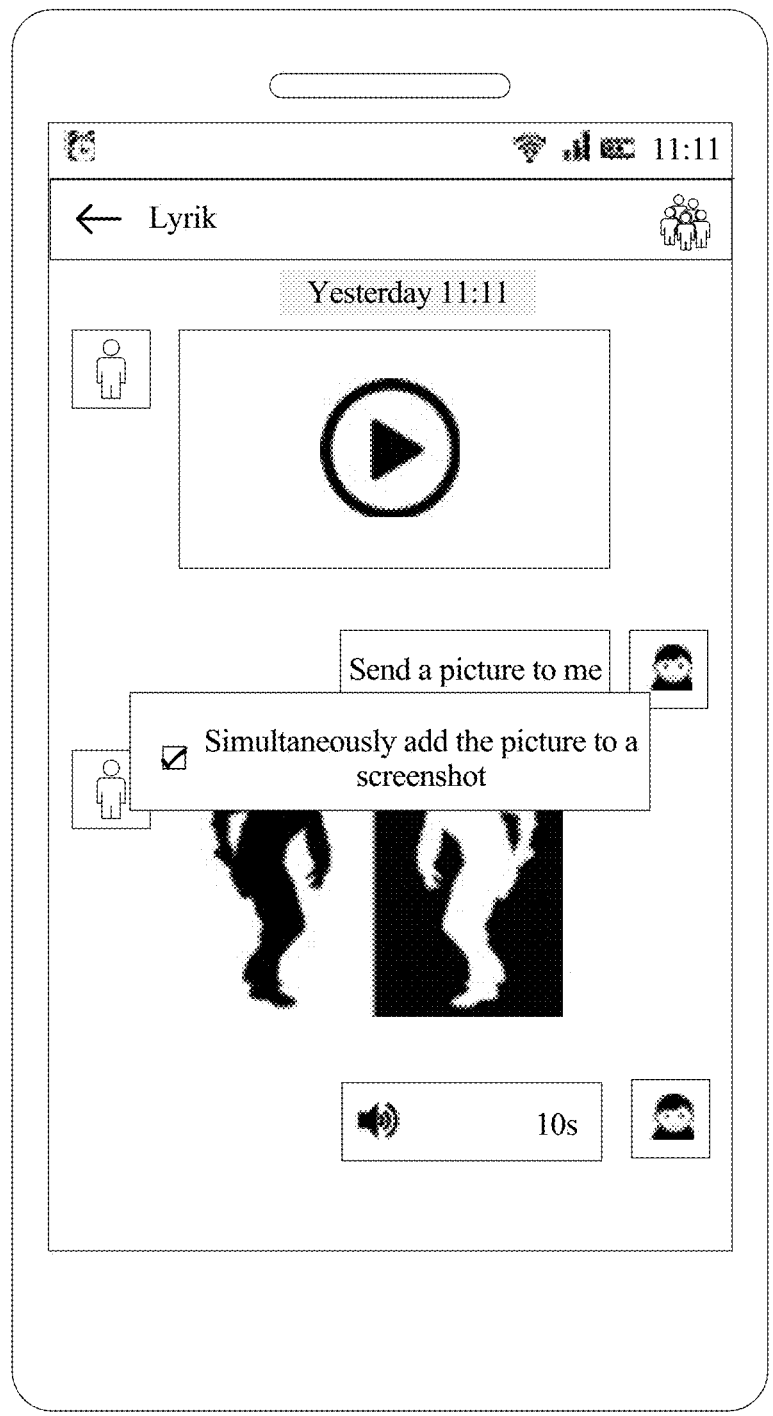
FIG. 9 is a schematic diagram of yet another interface according to an embodiment of this application.

1, it indicates that this video needs to be added to the screenshot picture of the user interface; or selecting, by using another input device 132 such as a physical button in the input unit 130, content that needs to be added. As shown in FIG. 8, if a current interface includes a plurality of multimedia files of a same type, the user may be prompted in a number manner to perform selection, or the user may be prompted in a preview manner to perform selection. If there are a plurality of pictures, a preview of the picture is displayed by using the display unit 140. As shown in FIG. 9, the user may alternatively add the picture element 403 in the current user interface to the screenshot when selecting the screenshot.

According to the foregoing method, the screenshot picture of the user interface is finally generated, and this step is processed by the processor 180 by executing the program code stored in the memory 120. If the current interface includes the target element, the screenshot picture of the user interface is generated according to the screenshot of the user interface, the target element, and the association relationship between the target element and the screenshot of the user interface. The finally generated screenshot picture of the user interface may include the target element, for example, as mentioned above, the target element is added to the thumbnail field (picture) or the audio field (audio) of the screenshot picture of the user interface. If the current interface includes only text information, a screenshot of the current interface is directly generated as the screenshot picture of the user interface. A screenshot including only the text information may be further generated during generation of the screenshot picture of the user interface.

The processor 180 executes a communications module program in the memory 120 to send, to another device, the screenshot picture of the user interface generated by using the foregoing method, and the another device includes another terminal device.

A transmission manner may include but is not limited to wired transmission and wireless transmission.

Figure 10A:
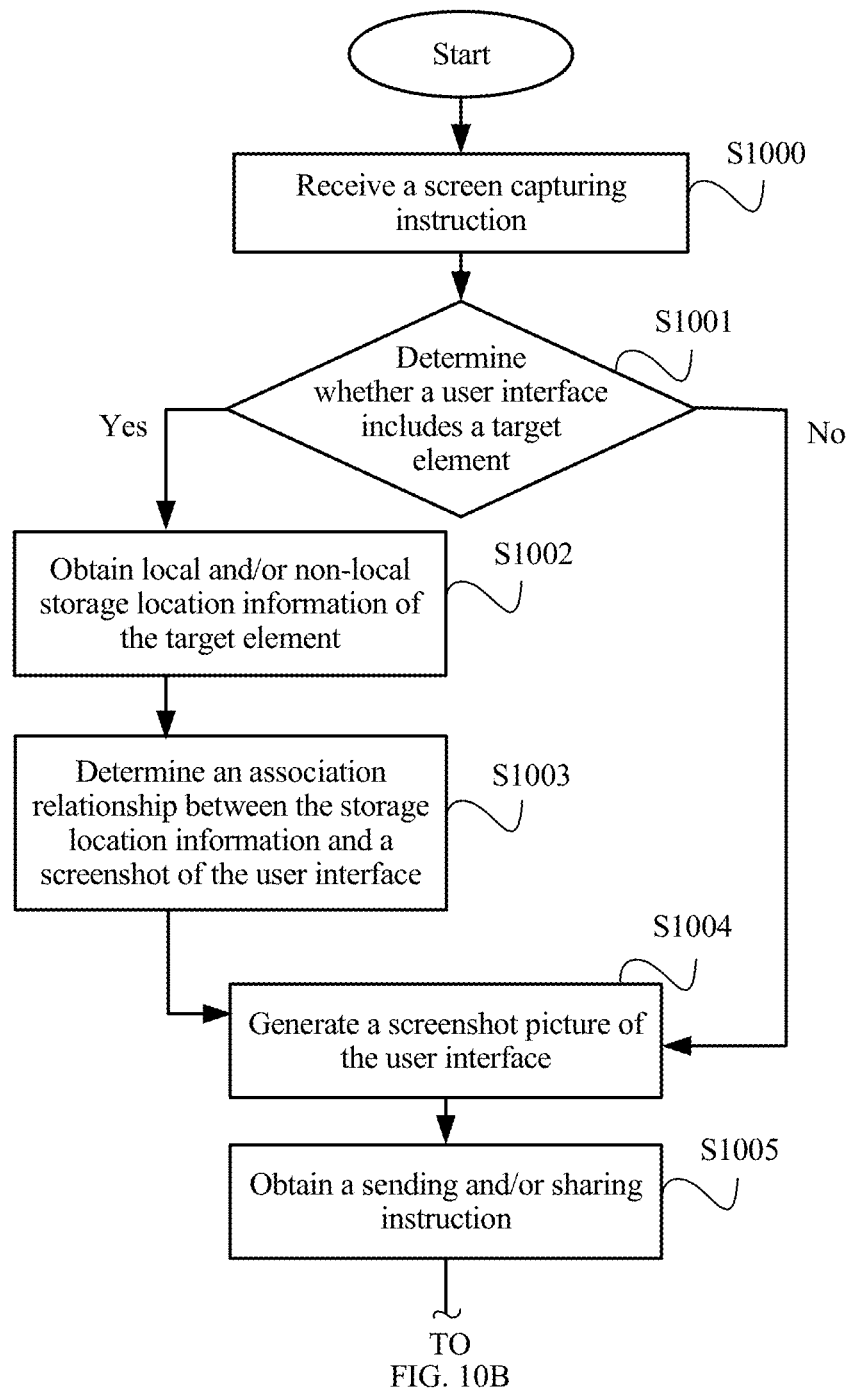
FIG. 10A and FIG. 10B are a flowchart of another screen capturing method according to an embodiment of the present invention.
Figure 10B:
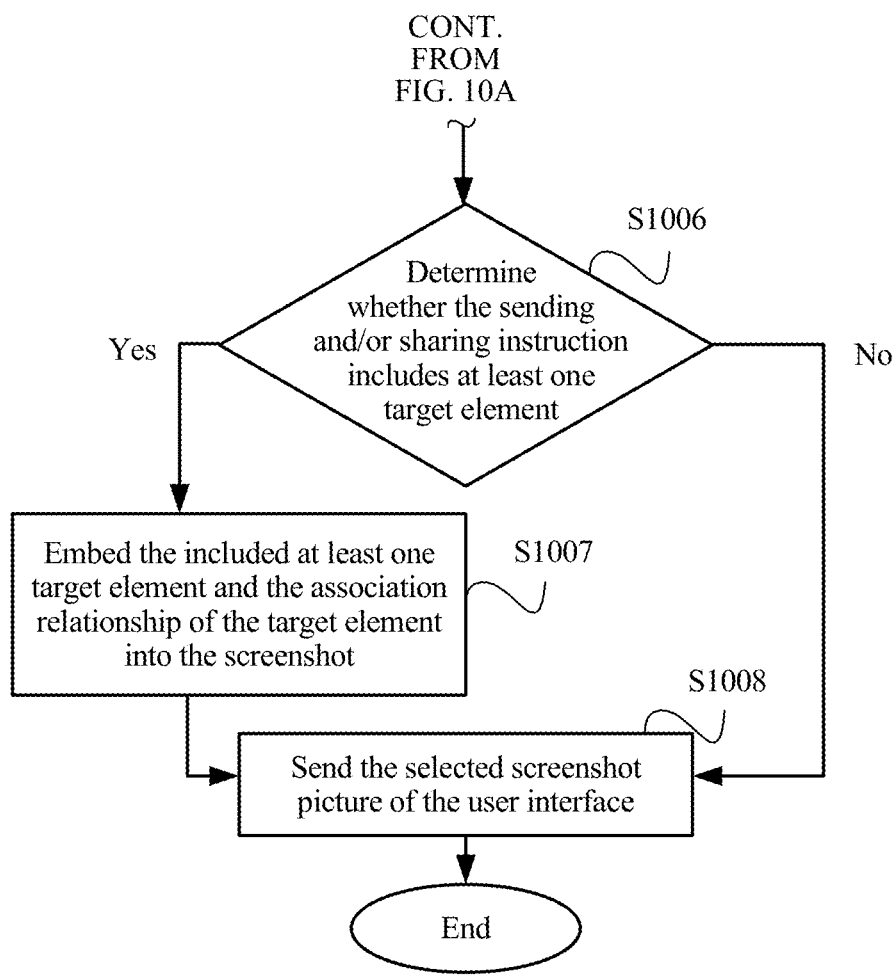

FIG. 10A and FIG. 10B are a flowchart of another screen capturing method according to an embodiment of the present invention. Embodiments of this application are further described below with reference to FIG. 10A and FIG. 10B to FIG. 14A and FIG. 14B. As shown in FIG. 10A and FIG. 10B, the method specifically includes the following steps.

S1000 and S1001 are the same as S210 and S220, and therefore details are not described herein again.

S1002. Obtain local and/or non-local storage location information of the target element.

An obtaining manner may be any one or any combination of the following:

Manner 1: When receiving the screen capturing instruction, a first terminal sends the screen capturing instruction to one or more application programs in a plurality of application programs running in foreground. The one or more application programs in the plurality of application programs obtain a storage location of the target element in the user interface. After receiving the screen capturing instruction, the one or more application programs in the plurality of application programs obtain the storage location of the target element in the user interface according to a request of the first terminal, and return the storage location to the first terminal. Optionally, when the target element requires an access permission, the one or more application programs in the plurality application programs need to at least give the first terminal a permission to read content of the target element.

Manner 2: After identifying the target element in the user interface in S1001, a first terminal searches storage space of the first terminal or a network for content of the corresponding target element according to the target element, and records a storage location of the found target element in a memory 120, which is, for example, shown in Table 1.

TABLE 1

| Element resource location |
|---|
| Pic:/temp/wechat/12.jpg |
| Audio:/temp/wechat/34.wma |

S1003. Determine an association relationship between the target element and a screenshot of the user interface.

A name and a storage location of a final screenshot picture may be pre-determined, and an association relationship between the finally generated screenshot picture of the user interface and the content of the target element is stored. Alternatively, the content of the target element included in the screenshot picture of the user interface may be cached in the first terminal, and after the screenshot picture of the user interface is generated in S1004, a corresponding association relationship is stored. It may be understood that the screenshot of the user interface may be understood as a screenshot to which the association relationship and the target element are not added.

For example, the association relationship may be stored in a form of Table 2:

TABLE 2

| Screenshot storage location | Quantity of element resources | Element resource location |
|---|---|---|
| /sdcard/screenshots/1.png | 2 | Picture (Pic): /temp/wechat/12.jpg Audio (Audio): /temp/wechat/34.wma |
| /sdcard/screenshots/2.png | 1 | Pic: /mobileqq/pic/qq.png |
| To be determined | 1 | Link (Link): http://www.huawei.com |

The two forms shown in the foregoing tables respectively indicate that a screenshot 1. png has two element resources: 12. jpg and 34. wma, and a screenshot 2. png has one element resource qq. png. An association list may be temporarily stored in memory, so that when the screenshot picture of the user interface is generated, the association list is added to attribute information of the screenshot. The association list may alternatively be directly stored in a non-volatile memory of a device, such as an SD card or a built-in storage card. The association list may alternatively be uploaded to a cloud for storage, and only an access link or a location stored in the cloud may be locally recorded in a form of a URL or a URI.

S1004. Generate a screenshot picture of the user interface.

In an implementable implementation, when the screenshot picture of the user interface is generated, a description field may be added to the screenshot picture of the user interface, to indicate that the screenshot picture of the user interface includes element content; and associated file information may be added to attribute information of the generated screenshot picture of the user interface.

S1005. Obtain a sending and/or sharing instruction.

Figure 11:
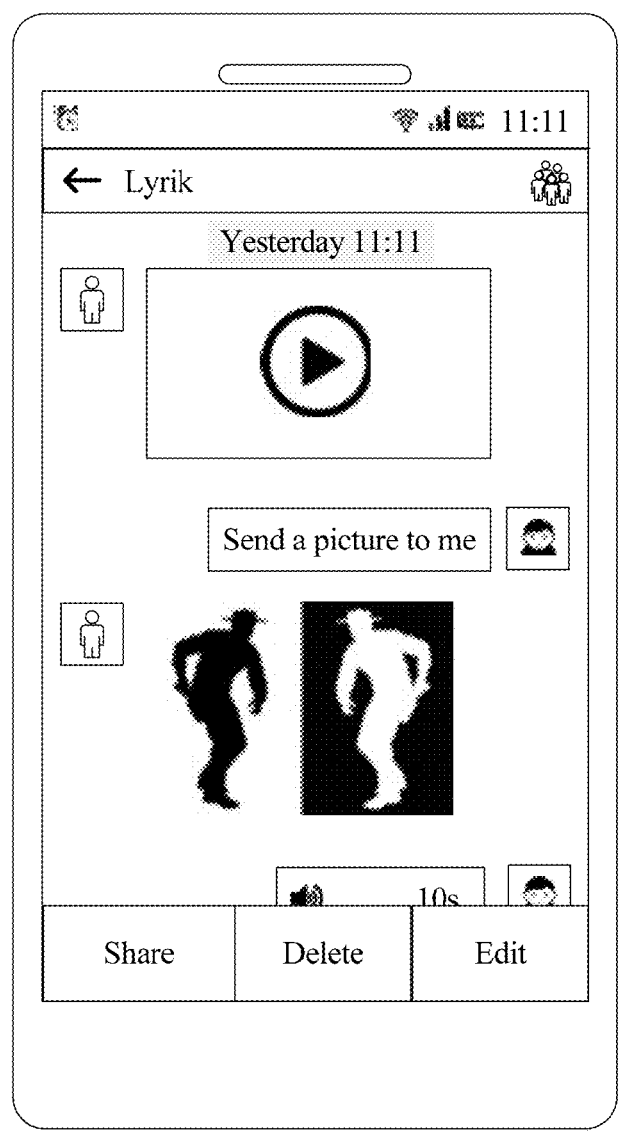
FIG. 11 is a schematic diagram of yet another interface according to an embodiment of this application.
Figure 12:
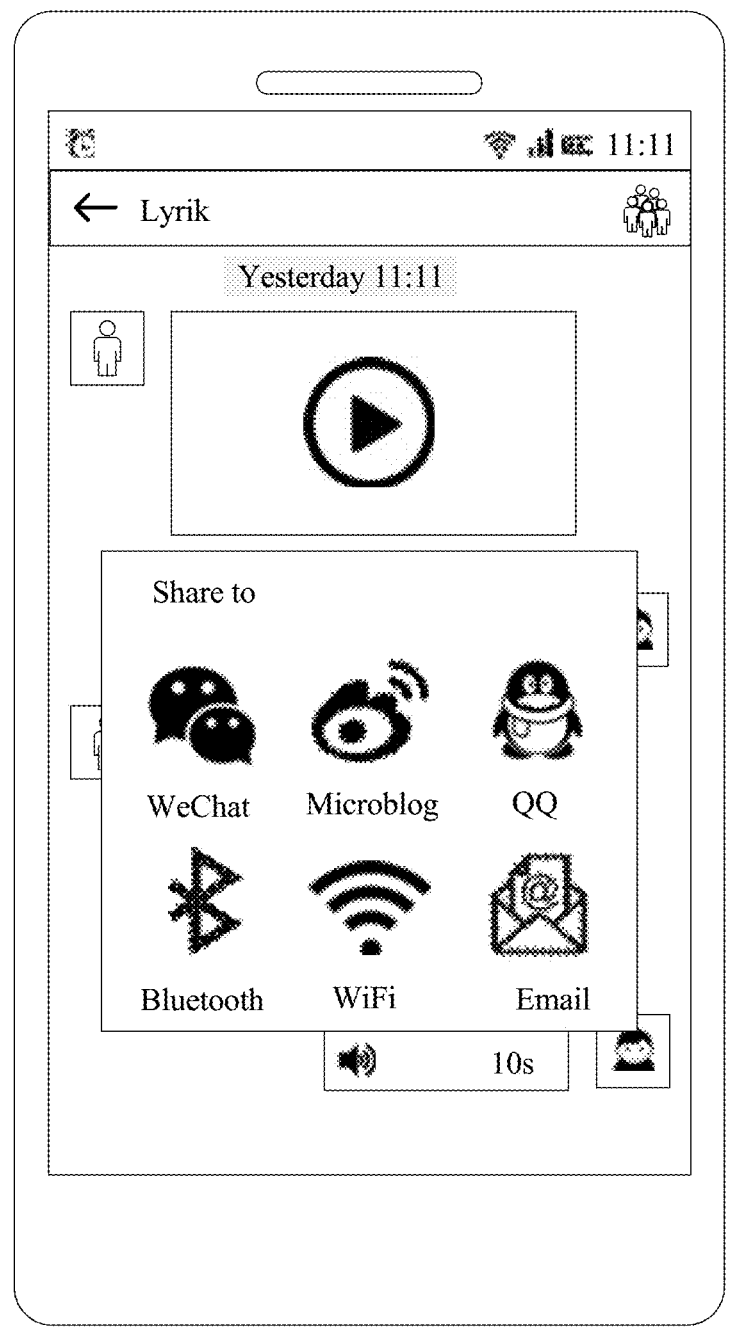
FIG. 12 is a schematic diagram of yet another interface according to an embodiment of this application.
Figure 13:
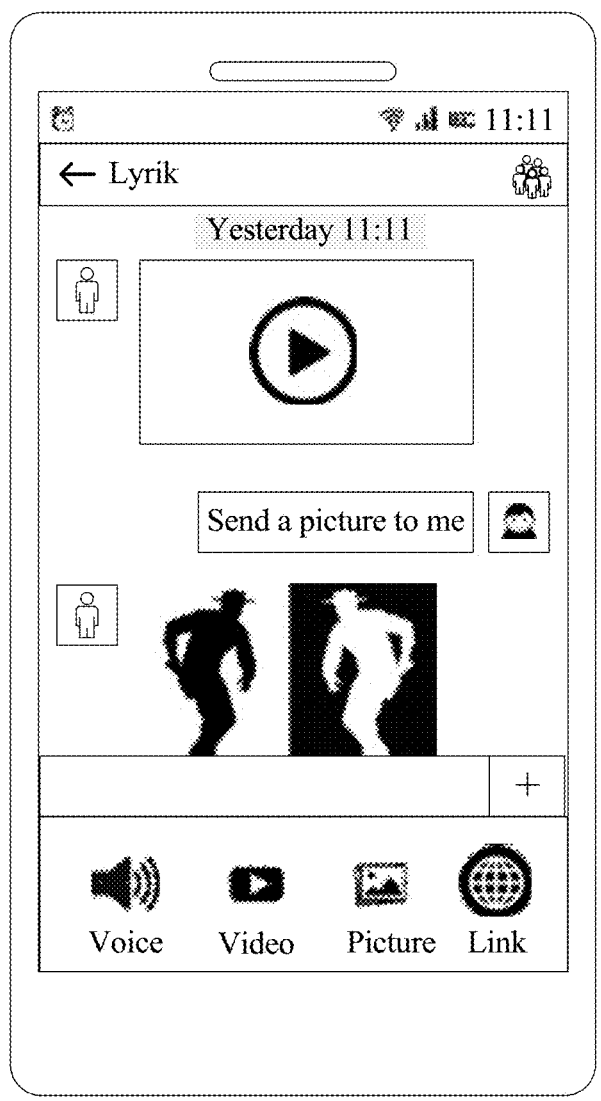
FIG. 13 is a schematic diagram of yet another interface according to an embodiment of this application.

A manner of sending and/or sharing the screenshot picture of the user interface may be as follows: After selecting a file in a picture browser/file manager, the user taps a sharing button and selects a sharing manner for sharing. As shown in FIG. 11, a user operation may be performed in an inputting manner mentioned in S1000. The user sends one or more screenshots in a chat interface by selecting a to-be-sent picture. For example, as shown in FIG. 13, the user may further edit to-be-shared multimedia content such as a picture or a video by using an edition interface such as an email client or instant messaging in an application program. In FIG. 12, WeChat and microblog are used as examples.

A manner of obtaining the foregoing operation may be: detecting a button location tapped by the user and an action triggered by a button. If the button triggers invoking of the picture browser, a current request of the user may be determined as a request for sharing the screenshot picture of the user interface. The method for obtaining a request of sending/sharing the screenshot picture of the user interface by the user is not limited herein, and the request of sending/sharing the screenshot picture of the user interface by the user may be obtained in any other feasible manner.

S1006. Determine whether the sending and/or sharing instruction includes at least one target element, and if the sending and/or sharing instruction includes the at least one target element, perform S1007, or otherwise, perform S1008. A determining manner may be as follows:

Whether the screenshot picture of the current user interface includes the content of the target element is checked by searching the association list of the screenshot picture of the user interface in S1003, whether there is an "a target element is included" label is checked by searching for attribute information in the screenshot picture file of the user interface in S1004, and whether the screenshot picture of the user interface includes the target element is determined by searching the association list added to a screenshot picture file of the user interface in S1004.

S1007. Add an associated target element to the screenshot picture of the user interface, and generate the selected screenshot picture of the user interface. This step is processed by a processor 180 by executing program code stored in a memory 120. A manner of embedding the target element into the screenshot picture of the user interface is the same as an embedding manner in S240, and a manner of generating a to-be-sent screenshot picture of the user interface is the same as a sending manner in S240. Details are not described herein again.

S1008. The processor 180 executes a communications module program in the memory 120 to send the screenshot picture of the user interface to another device, and the another device includes another terminal.

Figure 14A:
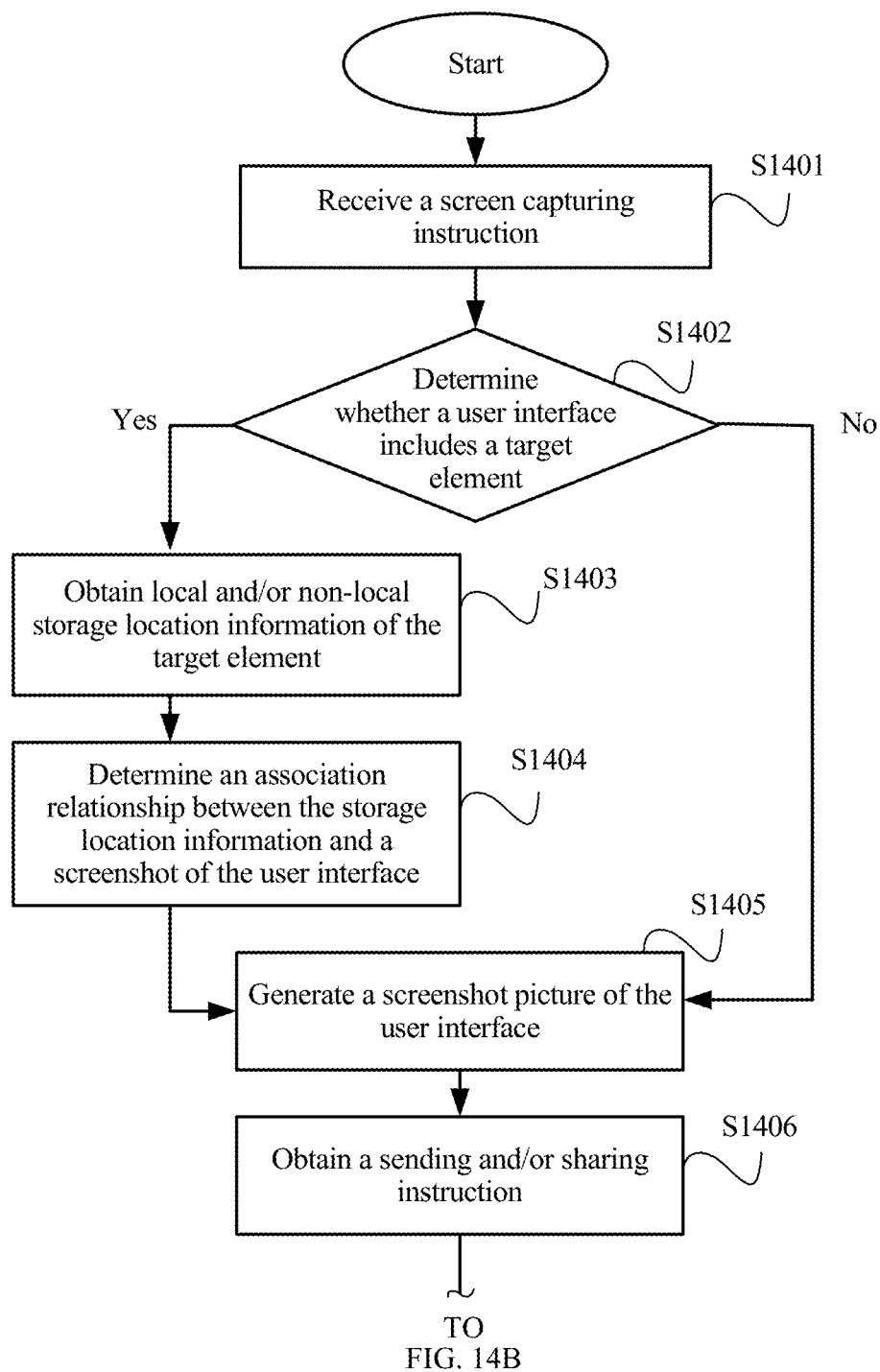
FIG. 14A and FIG. 14B are a flowchart of still another screen capturing method according to an embodiment of this application.
Figure 14B:
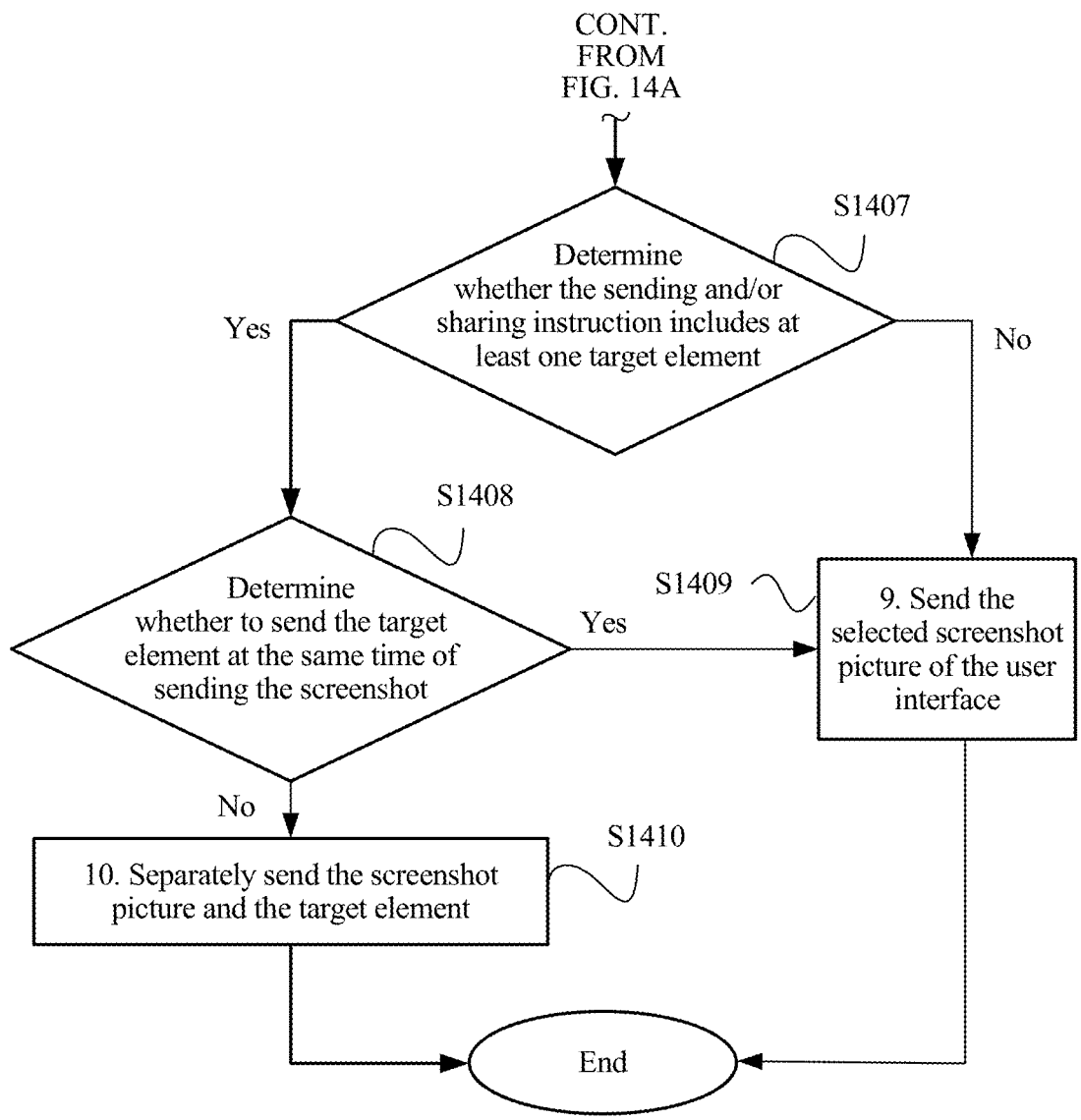

FIG. 14A and FIG. 14B are a flowchart of still another screen capturing method according to an embodiment of the present invention. As shown in FIG. 14A and FIG. 14B, the method specifically includes the following steps.

S1401 and S1402 are the same as S210 and S220, and therefore details are not described herein again.

S1403, S1404, S1405, S1406, and S1407 are the same as S1002, S1003, S1004, S1005, and S1006 in the flowchart of the another screen capturing method provided in the embodiment of the present invention in FIG. 10A and FIG. 10B, and therefore details are not described herein again.

S1408. Determine whether to send the target element at the same time of sending the screenshot of the user interface.

A user is prompted of whether to add the target element. If the user chooses not to add the target element but directly send the screenshot, S1409 is sent. Otherwise, S1410 is performed. An instruction receiving module receives a selection instruction that is input by the user by using an input unit, and an inputting manner includes but is not limited to an inputting manner in S1000.

S1409. A processor 180 executes a communications module program in a memory 120 to send the screenshot to another device.

S1410. Send the target element at the same time of sending the screenshot of the user interface. It should be noted that a difference from the embodiment described in FIG. 10A and FIG. 10B lies in that, in the embodiment described in FIG. 10A and FIG. 10B, a screenshot picture of the user interface is generated, and a new screenshot picture of the user interface includes at least one target element, but in this embodiment, a screenshot picture of the user interface is not generated and the screenshot of the user interface and the target element are separately sent, and in this case, the target element may be an original file of the target element, or may be a layout file of the target file.

For example, if the screenshot of the user interface includes two pictures (a picture A and a picture B) and a video, when choosing to send the screenshot, the user further needs to obtain a storage location of the target element according to an associated file after sending the screenshot of the user interface, that is, storage locations of the original picture A, the original picture B, and the video, and separately sends an original file and/or a layout file (for example, a web page link) of the original picture A, the original picture B, and the video to a receiver.

This embodiment is similar to the embodiment shown in FIG. 10A and FIG. 10B. In this step, the user may alternatively select the target element that needs to be sent, and send the target element according to user's selection.

Embodiments of this application are further described below with reference to FIG. 15 to FIG. 18.

Figure 15:
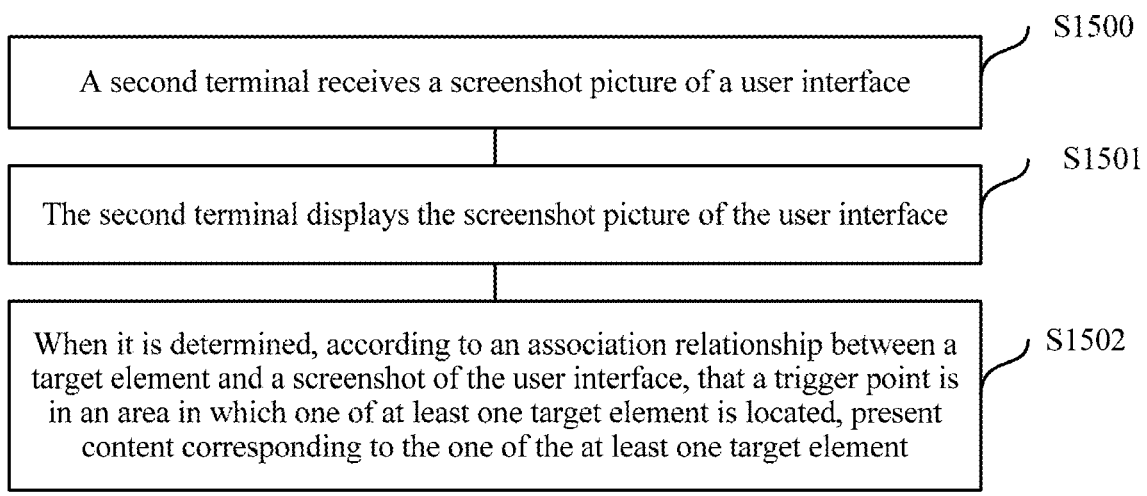
FIG. 15 is a flowchart of a screenshot reading method according to an embodiment of this application.

FIG. 15 is a flowchart of a screenshot reading method according to an embodiment of this application. As shown in FIG. 15, the method includes the following steps.

S1500. A second terminal receives a screenshot picture of a user interface.

The screenshot picture of the user interface includes a screenshot of a user interface of a first terminal, a target element, and an association relationship between the target element and the screenshot of the user interface. The target element includes an original file and/or a layout file, and a format of each of at least one target element includes at least one of a picture format, a video format, an audio format, a map format, or a hyperlink format. The target element is corresponding to the original file. The target element may include the layout file, the layout file may be corresponding to an application program, and the original file is displayed according to the layout file and the application program.

The target element may include a source address of the original file, the original file is obtained according to the source address of the original file, and the source address of the original file includes a uniform resource locator.

The first terminal may be the same as or different from the second terminal.

S1501. The second terminal displays a screenshot picture of a user interface of a first terminal.

For example, the second terminal may display the screenshot picture of the user interface of the first terminal in at least the following manners:

Manner 1: Receive an operation instruction that instructs a user to browse the screenshot picture of the user interface. If the user selects and opens a picture in a file management/picture browsing program, a display panel in a display unit 140 displays a picture preview interface stored in a memory 130 of a terminal 100, and a touch panel 131 or another input device 132 in an input unit 130 receives a selection operation performed by the user on the picture preview interface.

Manner 2: Receive a voice selection instruction of a user by using a microphone 162 of an audio frequency circuit 160, or receive, by using a gravity/acceleration sensor of a sensor 150, a gesture selection operation of a user such as shaking, or receive a gesture selection operation or an eyeball selection operation of a user by using an image sensor of a sensor 150.

The target element in the screenshot picture of the user interface may be obtained in the following manners: corresponding to the embodiments described in FIG. 2 and FIG. 6, directly obtaining the screenshot picture of the user interface; or corresponding to the embodiment described in FIG. 9, separately obtaining the screenshot of the user interface and the target element included in the screenshot of the user interface. A manner of obtaining the target element in the screenshot picture of the user interface may include but is not limited to the following manners:

identifying a target format in the screenshot picture of the user interface, and determining the target element according to the target format. An audio or thumbnail field in the screenshot picture of the user interface may be read according to the target format, and corresponding audio and picture content may be obtained; and a corresponding target element may be obtained by using an associated target element included in the screenshot picture of the user interface. When the target element is obtained in the foregoing manners, a size, a shape, and a location of a displayed element that represents the target element may be obtained, to prompt the user during display of the screenshot picture of the user interface.

S1502. When it is determined, according to an association relationship between a target element and a screenshot of the user interface, that a trigger point is in an area in which one of at least one target element is located, present content corresponding to the one of the at least one target element.

Corresponding to FIG. 2 and/or FIG. 10A and FIG. 10B, the screenshot picture of the user interface is received. The trigger point may be a user touch point triggered by the user on the touch panel 131, for example, a mouse cursor. The display unit 140 displays the selected screenshot picture of the user interface, and opens and displays the corresponding screenshot picture of the user interface. A display manner may be full screen display or half-screen display, or may be displayed in any size. Before the screenshot picture of the user interface is displayed, the screenshot picture of the user interface may be tailored, or expanded, or added with background.

Figure 16:
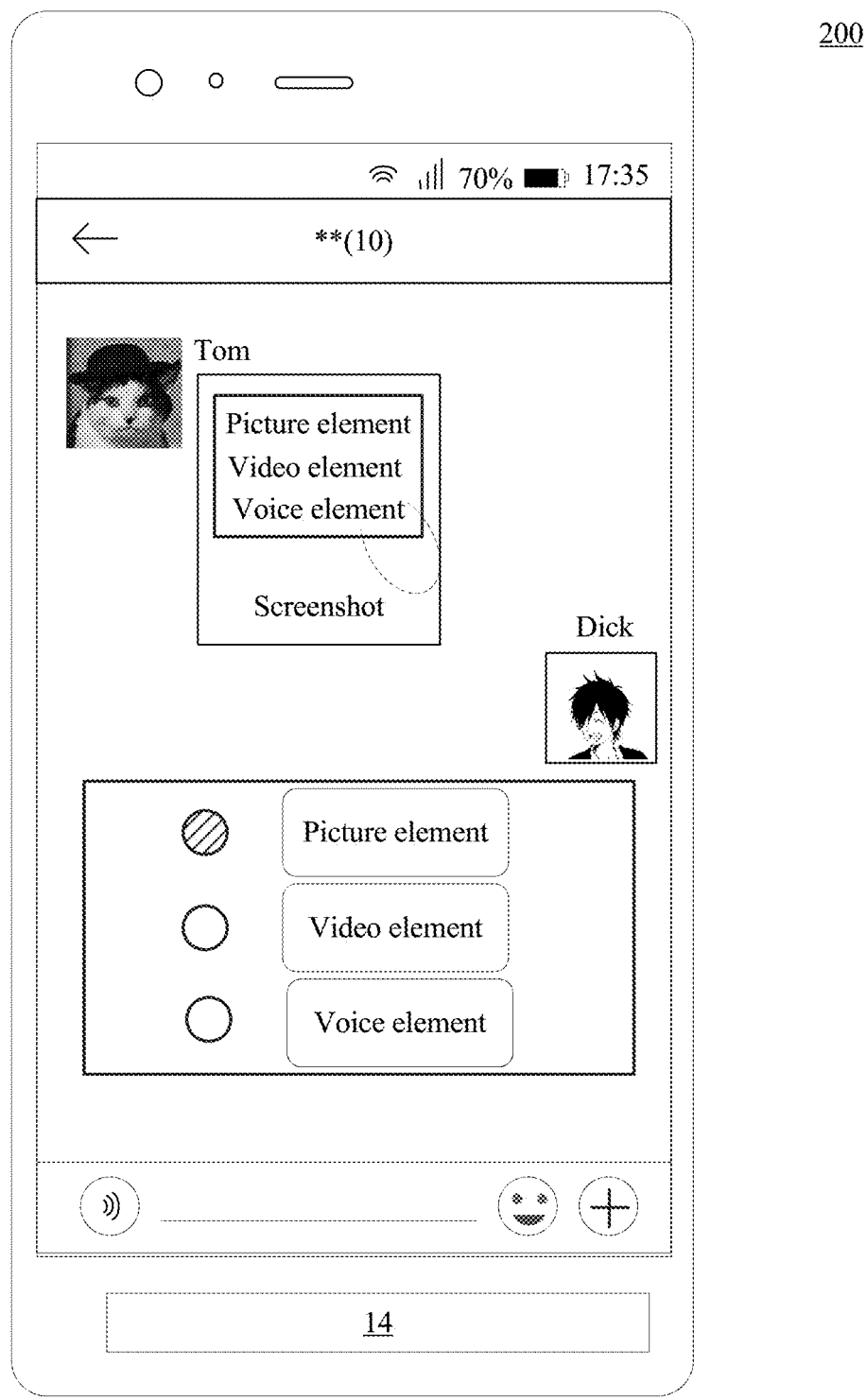
FIG. 16 is a schematic diagram of yet another interface according to an embodiment of this application.

The foregoing operation is further described with reference to FIG. 16. After the user triggers a screenshot picture of the user interface sent by Tom, the second terminal pops up a prompt box, and the prompt box prompts the user to choose to obtain and view a picture element, a video element, or a voice element. If the picture element is selected, the picture element is obtained. If the picture element, the video element, or the voice element is a layout file (for example, a web page link), the user may choose whether to download the picture from a web page.

In an implementable embodiment, the terminal may highlight the target element identified from the target element in the screenshot picture of the user interface. If the screenshot picture of the user interface includes audio, an icon corresponding to the audio may be highlighted, and a highlighting manner includes but is not limited to: bolding a frame, changing a frame color, changing a frame shape, changing an icon size, and displaying in an animation effect.

When receiving an operation performed by the user on the screenshot picture of the user interface, the second terminal determines whether the screenshot picture of the current user interface includes the target element. When a user operation is received by using the touch panel 131, current touch location coordinates may be obtained, and according to the current touch location coordinates, an operation target is content at a corresponding coordinate location in the screenshot picture of the user interface.

When a voice operation instruction of the user is received by using the microphone 162, the voice operation instruction of the user may be converted into a text through voice recognition, and a corresponding operation target is searched for by using the text and content included in the screenshot picture of the user interface. For example, if the voice operation instruction is "play first audio", the first audio included in the screenshot picture of the user interface may be searched for, and the found first audio is used as the operation target.

In the foregoing manner of obtaining a current operation target, an attribute of the operation object may be determined after the operation object is obtained. If the user operation is received by using the touch panel 131, the obtained operation target is a picture, and a corresponding picture file can be found, it is determined that a current operation target is the target element. Similarly, when the operation target is audio, and a corresponding audio file can be found, it is determined that a current operation target is the target element.

Figure 17:
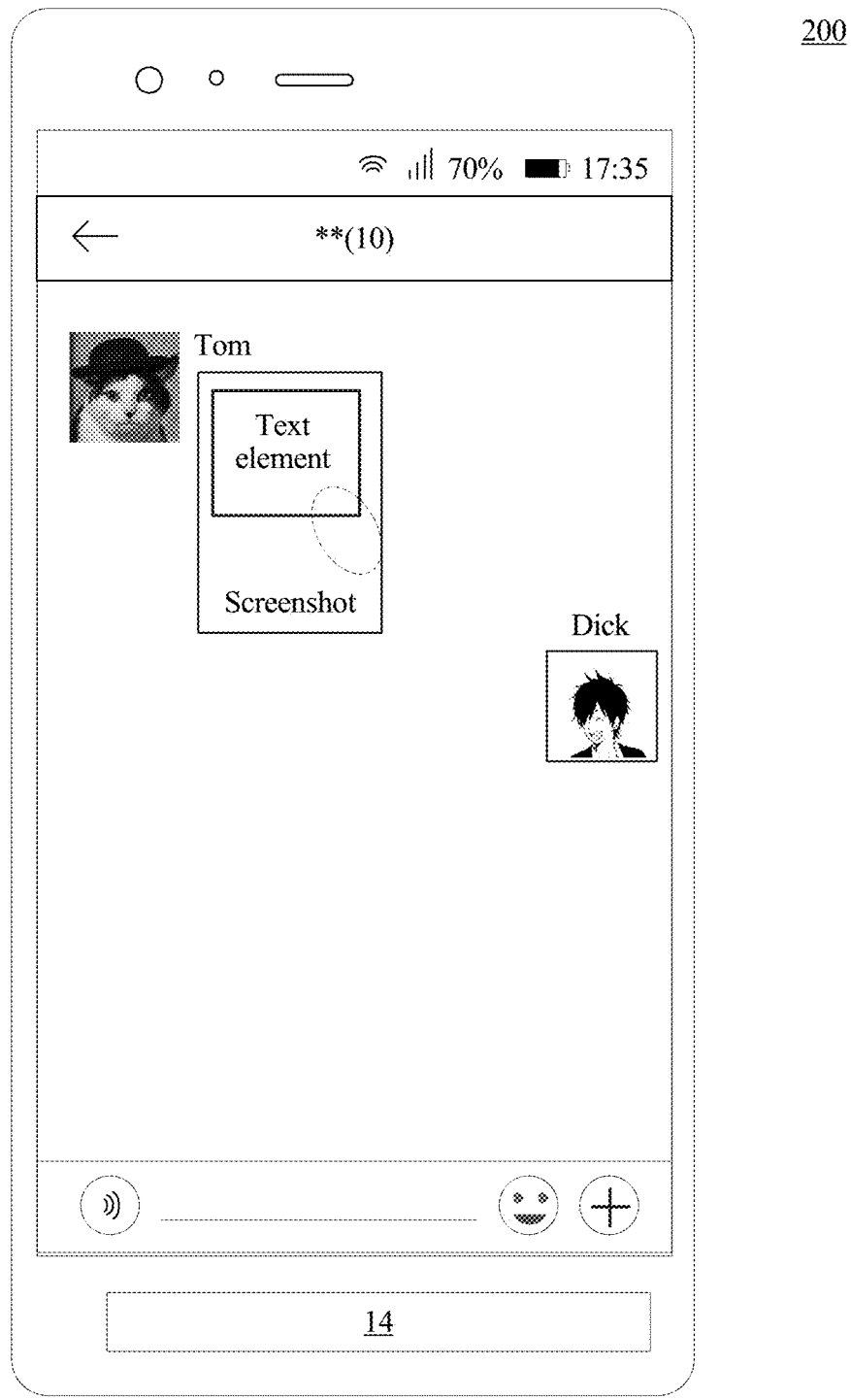
FIG. 17 is a schematic diagram of yet another interface according to an embodiment of this application.

As shown in FIG. 17, if the operation target includes only text information, a text operation option is provided for the user. The text operation option includes free selection, copy, text search, and the like. Text content may be identified in an OCR manner, and for non-text content, an operation option is provided for the user according to an existing operation response.

Corresponding to FIG. 14A and FIG. 14B, the screenshot picture of the user interface is received. In the embodiment shown in FIG. 14A and FIG. 14B, the screenshot picture of the user interface and the target element are separately sent. Therefore, the following steps may be performed during receiving: First, receive the screenshot picture of the user interface, and then receive the at least one target element.

Figure 18:
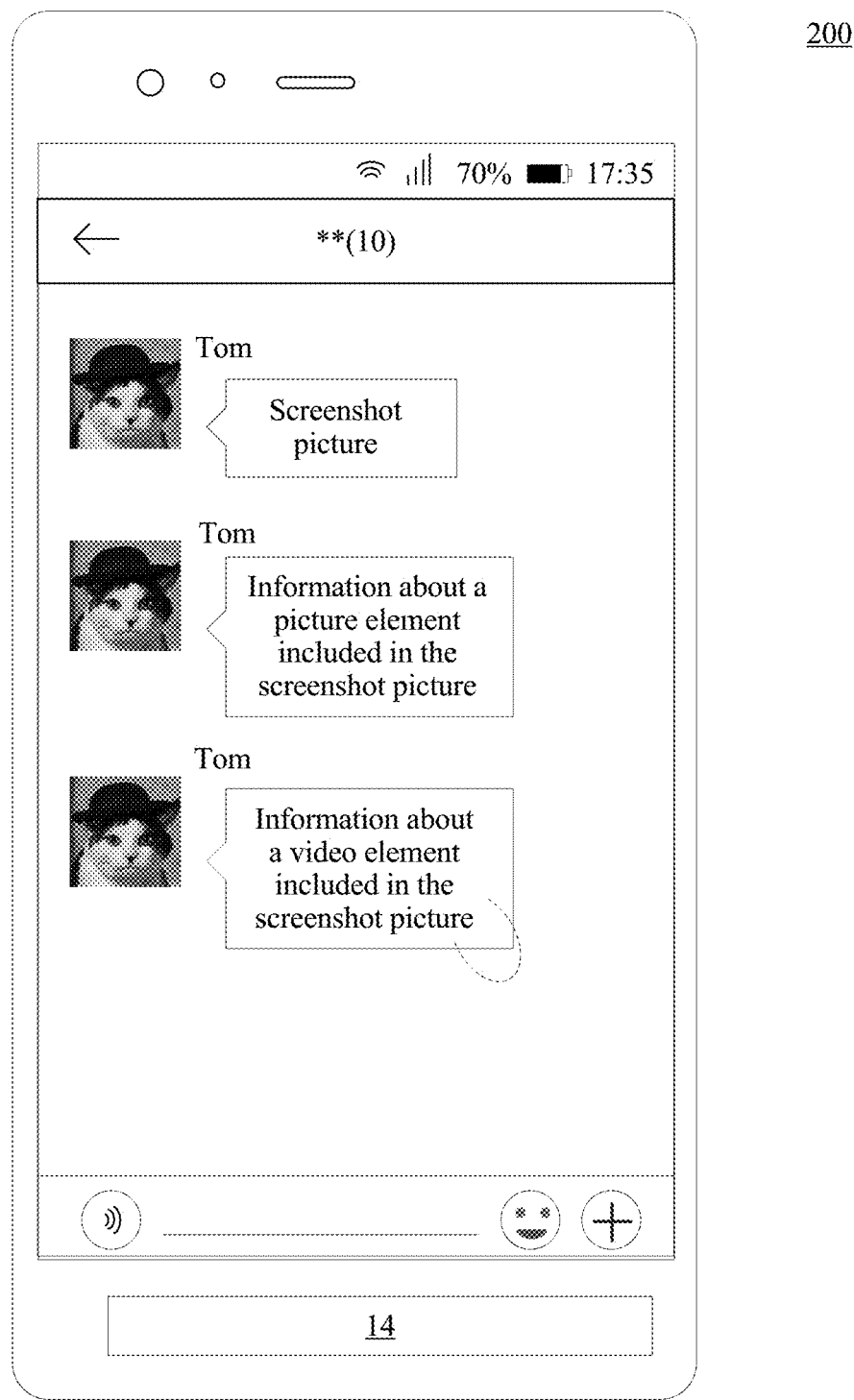
FIG. 18 is a schematic diagram of yet another interface according to an embodiment of this application.

As shown in FIG. 18, further description is provided: When sending a screenshot picture, Tom chooses to separately send the screenshot picture and at least one element. Therefore, during receiving, it may be shown in FIG. 18 that the user may trigger required element information according to a requirement. During receiving, one message may be received, and the message includes a picture element and a video element. Alternatively, two messages are received. A received first message is a picture element, and a received second message is a video element. The foregoing at least one target element may include an original file and/or a layout file (for example, a web page link) of the target element.

When the operation target includes not only text information, a target element corresponding to the operation target is obtained herein. Corresponding to the embodiments described in FIG. 2 and FIG. 10A and FIG. 10B, a manner of storing the target element in the embodiment described in FIG. 14A and FIG. 14B may be separately: obtaining a file of the target element from the screenshot picture of the user interface, searching an association list of the target element in the screenshot picture of the user interface for a storage location of the target element, and searching for the corresponding target element at the storage location.

It should be noted that corresponding content is output according to a current operation target. When the current operation target is audio, the audio is played by using a speaker 161. When the current operation target is a picture, the picture is displayed by using the display unit 140. When the current operation target is a video, audio in the video is played by using a speaker 161, and a picture (a video frame) in the video is displayed by using the display unit 140.

Figure 19:
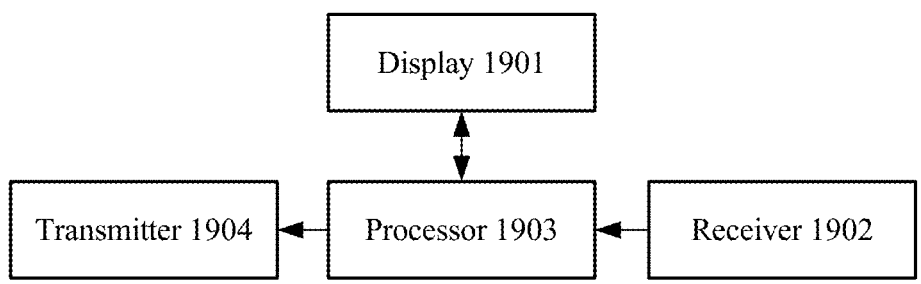
FIG. 19 is a schematic structural diagram of a terminal involved in an embodiment of this application.

FIG. 19 is a schematic structural diagram of a terminal involved in an embodiment of this application. As shown in FIG. 19, the terminal includes: a display 1901, a receiver 1902, a processor 1903, and a transmitter 1904.

A transceiver may include the receiver 1902 and the transmitter 1904, and the receiver and the transmitter may be integrated together. The transmitter adjusts (for example, through analog conversion, filtering, amplification, or up-conversion) the output sampling and generates an uplink signal. The uplink signal is transmitted to a network device by using an antenna. In downlink, the antenna receives a downlink signal transmitted by the network device in the foregoing embodiment. The receiver adjusts (for example, through filtering, amplification, down-conversion, or digitization) a signal received from the antenna and provides input sampling. The terminal may further include a modem processor, the modem processor receives service data and a signaling message that are to be sent in the uplink, and processes (such as formatting, coding, or interleaving) the service data and the signaling message. The modem processor further processes (such as, symbol mapping or modulation) encoded service data and an encoded signaling message, and provides output sampling; processes (such as, demodulates) the input sampling and provides symbol estimation; and processes (such as, de-interleaves or decodes) the symbol estimation and provides decoded data and a decoded signaling message to be sent to UE. These units perform processing according to a radio access technology (such as an access technology in LTE or another evolution system) used by a radio access network.

The processor controls and manages an action of the terminal, and is configured to perform processing performed by the terminal in the foregoing embodiments. For example, the processor is configured to control screen capturing and/or another process of a technology described in the present invention. The terminal provided in this application is described in detail by using FIG. 19 as an example, and details are specifically as follows.

The receiver is configured to receive a screen capturing instruction, and the screen capturing instruction is used to instruct to capture a user interface of a first terminal.

The processor is configured to determine a target element in the user interface.

The processor is further configured to: determine an association relationship between the target element and a screenshot of the user interface, and determine a screenshot picture of the user interface. The screenshot picture of the user interface includes the screenshot of the user interface, the target element, and the association relationship between the target element and the screenshot of the user interface.

The processor is specifically configured to determine the target element according to a target format, the target format includes at least one of a picture format, a video format, an audio format, a map format, or a hyperlink format, and each target format includes at least one format.

The processor is specifically configured to determine content of the target element, the content includes a layout file and/or an original file, and the layout file includes source code and a source address of the target element.

The association relationship between the target element and the screenshot of the user interface includes: an association relationship between the target element and a location of the target element in the screenshot of the user interface, and an association relationship between the target element and a proportion of the target element in the screenshot of the user interface.

The processor is specifically configured to embed the screenshot, the target element, and the association relationship between the target element and the screenshot of the user interface into a metadata field of the screenshot picture of the user interface.

The receiver is specifically configured to receive the screen capturing instruction, and the screen capturing instruction is used to instruct the first terminal to obtain the screenshot of the user interface of the first terminal. The processor is specifically configured to determine, according to the screen capturing instruction, one or more application programs in a plurality of application programs running in foreground of the first terminal.

The processor is specifically configured to determine the target element in the user interface according to at least one application program running in the foreground and a target format, the target format includes at least one of a picture format, a video format, an audio format, a map format, or a hyperlink format, and each target format includes at least one format.

The processor is specifically configured to determine content of the target element according to the at least one application program running in the foreground, the content includes a layout file and/or an original file, and the layout file includes source code and a source address of the target element. The display is configured to display a selection list of the target element, to prompt a user to select one or more target elements in the selection list of the target element. The processor is specifically configured to embed, into the screenshot picture of the user interface, a screenshot of an interface obtained after the user performs selection, a target element selected by the user, and an association relationship between the target element selected by the user and the screenshot of the interface obtained after the user performs selection.

The foregoing "selection list of the target element" may include a number and/or preview information of the target element.

The transmitter is configured to send the screenshot picture of the user interface, and the screenshot picture of the user interface includes the screenshot of the user interface, the target element, and the association relationship between the target element and the screenshot of the user interface.

The processor is specifically configured to: if the user interface of the first terminal includes a plurality of target elements selected by the user, separately send the screenshot of the user interface and the plurality of target elements selected by the user; and the sending the plurality of target elements selected by the user includes: using a method for sending the original file and/or the layout file in the target element.

Figure 20:
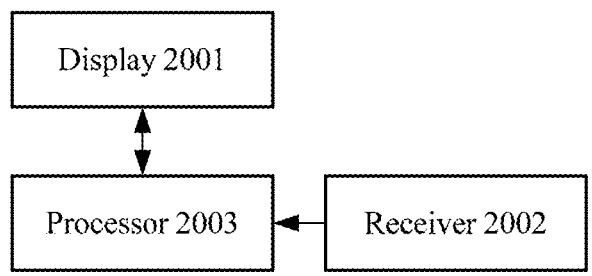
FIG. 20 is a schematic structural diagram of another terminal involved in an embodiment of this application.

FIG. 20 is a schematic structural diagram of another terminal involved in an embodiment of this application. As shown in FIG. 20, the terminal includes: a display 2001, a receiver 2002, and a processor 2003. It should be noted that the another terminal provided in this application is the same as the terminal provided in FIG. 19 in terms of structure and function, and the only difference is that different interfaces are displayed for distinguishing two steps: screen capturing and screenshot reading.

The processor controls and manages an action of the terminal, and is configured to perform processing performed by the terminal in the foregoing embodiments. For example, the processor is configured to control screen capturing and/or another process of a technology described in the present invention. The another terminal provided in this application is described in detail by using FIG. 19 as an example, and details are specifically as follows.

The receiver is configured to receive a screenshot picture of a user interface. The screenshot picture of the user interface includes a screenshot of the user interface, a target element, and an association relationship between the target element and the screenshot of the user interface. The processor is configured to: when determining, according to the association relationship between the target element and the screenshot of the user interface, that a trigger point is in an area in which one of at least one target element is located, display an original file corresponding to the one of the at least one target element. A layout file includes source code and source address of the target element.

The terminal may further include the display, configured to present the one target element, including: presenting, by the display, content of the one target element, where the content includes a layout file, the layout file includes source code and a source address of the target element, and the layout file is corresponding to an application program; and displaying the content of the one target element according to the layout file and the application program. The foregoing "target element" may include a source address of the original file, the original file is obtained according to the source address of the original file, and the source address of the original file includes a uniform resource locator.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

Persons of ordinary skill in the art may understand that all or a part of the steps in each of the foregoing methods of the embodiments may be implemented by a program instructing processor. The foregoing program may be stored in a computer readable storage medium. The storage medium may be a non-transitory (English: non-transitory) medium, such as a random-access memory, read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely example implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A screen capturing method of a terminal, comprising:
receiving a screen capturing instruction, wherein the screen capturing instruction is used to instruct the terminal to obtain a screenshot of a user interface of the terminal;
determining a subset of elements displayed in the user interface as potential target elements according to at least one application program running in a foreground and a target format;
displaying a selection list of the potential target elements in the user interface to prompt a user to select at least one of the potential target elements as a target element; and
in response to user input indicating a selection of at least one of the potential target elements as the target element:
determining the target element in the user interface, wherein the target element comprises a picture, a video, an audio, a map or a hyperlink;
determining an association relationship between the target element and the screenshot of the user interface; and
generating a screenshot picture of the user interface, wherein the screenshot picture comprises the screenshot of the user interface, and wherein generating the screenshot picture of the user interface includes embedding, into the screenshot picture of the user interface:
a screenshot of the user interface obtained after receiving the user input indicating the selection,
the target element, and
information representing an association relationship between the target element and the screenshot of the user interface obtained after receiving the user input indicating the selection.

2. The method according to claim 1, wherein the generating a screenshot picture of the user interface comprises:
embedding the screenshot of the user interface obtained after receiving the user input indicating the selection, the target element, and the information representing the association relationship between the target element and the screenshot of the user interface into a metadata field of the screenshot picture of the user interface.

3. The method according to claim 1, wherein the determining a target element in the user interface comprises:
determining content of the target element, wherein the content comprises a layout file, and the layout file comprises source code and a source address of the target element.

4. The method according to claim 1, wherein the association relationship between the target element and the screenshot of the user interface comprises:
an association relationship between the target element and a location of the target element in the screenshot of the user interface, and an association relationship between the target element and a proportion of the target element in the screenshot of the user interface.

5. The method according to claim 1, wherein after the embedding, the method further comprises:
sending the screenshot picture of the user interface.

6. The method according to claim 5, wherein the sending the screenshot picture of the user interface comprises:
if the user interface of the first terminal comprises a plurality of target elements selected by the user, separately sending the screenshot of the user interface and the plurality of target elements selected by the user; and the sending the plurality of target elements selected by the user comprises: using a method for sending the original file in the target element selected by the user.

7. The method according to claim 5, wherein the sending the screenshot picture of the user interface comprises:
if the user interface of the first terminal comprises a plurality of target elements selected by the user, separately sending the screenshot of the user interface and the plurality of target elements selected by the user; and
the sending the plurality of target elements selected by the user comprises: using a method for sending a layout file in the target element selected by the user.

8. A screen capturing terminal, comprising:
a memory comprising instructions; and
a processor coupled to the memory, the instructions being executed by the processor to cause the terminal to be configured to:
receive a screen capturing instruction, wherein the screen capturing instruction is used to instruct the terminal to obtain a screenshot of a user interface of the terminal;
determine a subset of elements displayed in the user interface as potential target elements according to at least one application program running in a foreground and a target format;
display a selection list of the potential target elements in the user interface to prompt a user to select at least one of the potential target elements as a target element; and
in response to user input indicating a selection of at least one of the potential target elements as the target element:
determine the target element in the user interface, wherein the target element comprises a picture, a video, an audio, a map or a hyperlink;
determine an association relationship between the target element and the screenshot of the user interface; and
generate a screenshot picture of the user interface, wherein the screenshot picture comprises the screenshot of the user interface, wherein generating the screenshot picture of the user interface includes embedding, into the screenshot picture of the user interface:
a screenshot of the user interface obtained after receiving the user input indicating the selection, the target element, and
information representing the association relationship between the target element and the screenshot of the user interface obtained after receiving the user input indicating the selection.

9. The terminal according to claim 8, the instructions further cause the terminal to:
embed the screenshot of the user interface obtained after receiving the user input indicating the selection, the target element, and the information representing the association relationship between the target element and the screenshot of the user interface into a metadata field of the screenshot picture of the user interface.

10. The terminal according to claim 8, the instructions further cause the terminal to:
determine content of the target element, wherein the content comprises a layout file, and the layout file comprises source code and a source address of the target element.

11. The terminal according to claim 10, the instructions further cause the terminal to:
send the layout file in the plurality of target elements selected by the user.

12. The terminal according to claim 8, wherein the association relationship between the target element and the screenshot of the user interface comprises:
an association relationship between the target element and a location of the target element in the screenshot of the user interface, and an association relationship between the target element and a proportion of the target element in the screenshot of the user interface.

13. The terminal according to claim 8, the instructions further cause the terminal to:
send the screenshot picture of the user interface.

14. The terminal according to claim 13, the instructions further cause the terminal to:
send the screenshot of the user interface and a plurality of target elements selected by the user separately, when the user interface of the first terminal comprises the plurality of target elements selected by the user.

15. The terminal according to claim 14, the instructions further cause the terminal to:
send the original file in the plurality of target elements selected by the user.

\* \* \* \* \*